(12) United States Patent
Berntorp et al.

(10) Patent No.: US 11,679,759 B2
(45) Date of Patent: Jun. 20, 2023

(54) SYSTEM AND METHOD FOR ADAPTIVE CONTROL OF VEHICLE DYNAMICS

(71) Applicant: Mitsubishi Electric Research Laboratories, Inc., Cambridge, MA (US)

(72) Inventors: Karl Berntorp, Newton, MA (US); Ankush Chakrabarty, Cambridge, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 180 days.

(21) Appl. No.: 17/159,815

(22) Filed: Jan. 27, 2021

(65) Prior Publication Data
US 2022/0234570 A1  Jul. 28, 2022

(51) Int. Cl.
*B60W 40/00* (2006.01)
*B60W 30/04* (2006.01)
*B60W 40/112* (2012.01)
*B60W 40/13* (2012.01)

(52) U.S. Cl.
CPC .......... *B60W 30/04* (2013.01); *B60W 40/112* (2013.01); *B60W 40/13* (2013.01); *B60W 2030/043* (2013.01); *B60W 2040/1315* (2013.01); *B60W 2520/18* (2013.01)

(58) Field of Classification Search
None
See application file for complete search history.

(56) References Cited

U.S. PATENT DOCUMENTS

| 2016/0068166 A1* | 3/2016 | Chen | B60W 40/112 701/32.9 |
| 2019/0188592 A1* | 6/2019 | Berntorp | G06N 7/005 |
| 2020/0331317 A1* | 10/2020 | Nasu | B60W 10/08 |

* cited by examiner

*Primary Examiner* — James M McPherson
(74) *Attorney, Agent, or Firm* — Gennadiy Vinokur; Hironori Tsukamoto

(57) ABSTRACT

A vehicle dynamics control system receives a feedback state signal including values of a roll rate and a roll angle of the motion of the vehicle and updates parameters of a model of roll dynamics of the vehicle by fitting the received values into the roll dynamics model. The roll dynamics model explains the evolution of the roll rate and the roll angle based on the parameters including a center of gravity (CoG) parameter modeling a location of a CoG of the vehicle, and a spring constant and a damping coefficient modeling suspension dynamics of the vehicle. The system determines a control command for controlling at least one actuator of the vehicle using a motion model including the updated CoG parameter and submits the control command to the vehicle controller to control the motion of the vehicle.

20 Claims, 25 Drawing Sheets

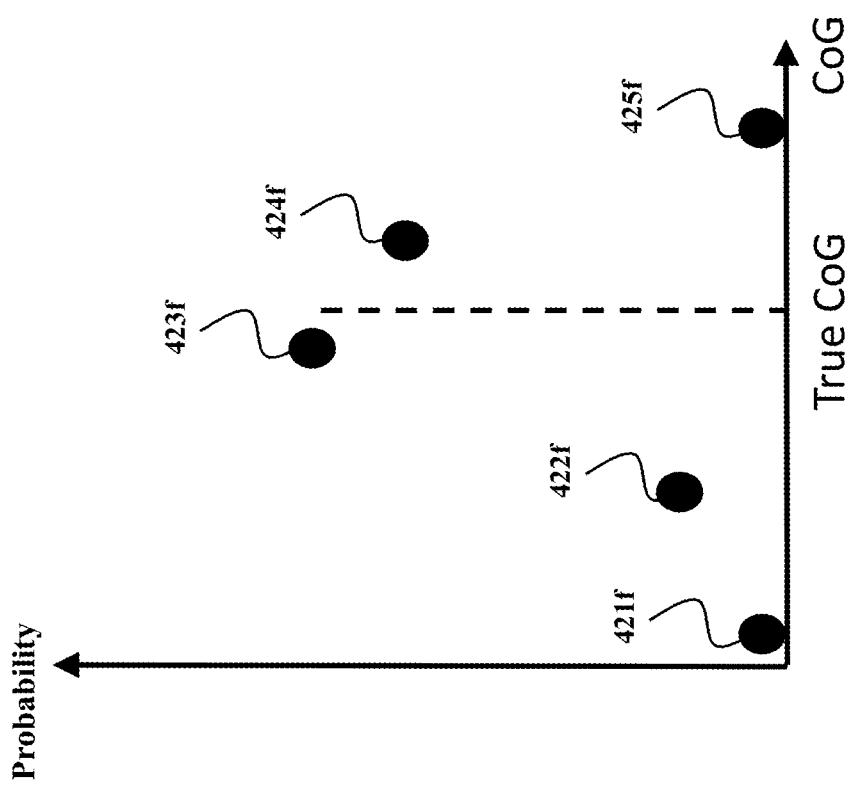

SYSTEM AND METHOD FOR ADAPTIVE CONTROL OF VEHICLE DYNAMICS

TECHNICAL FIELD

The invention relates generally to vehicle control, and more particularly to a system and a method for adaptive control of vehicle dynamics such as rollover control of the vehicle.

BACKGROUND

To design roll-dynamics control methods, such as rollover avoidance systems based on differential braking systems or active front steering (AFS), it is imperative to have at least a basic understanding of the inertial parameters, such as mass and inertia, and the location of the mass, that is, the center of gravity (CoG). Automotive manufacturers can provide values for the inertial parameters and the CoG. However, they are typically for some nominal (usually empty) loading conditions, whereas in reality the loading conditions, hence the CoG, will vary significantly between different drives.

Rollover accidents are relatively uncommon, but they constitute a large proportion of severe accidents and fatalities. Hence, the development of improved control principles for avoiding such accidents is of importance. The automotive manufacturers usually employ robust active road-handling control strategies to account for the unknown and changing CoG, by designing for the worst-case scenario. Another common approach in the case of Sport Utility Vehicles (SUVs) is to intentionally design the vehicle heavier than usual by adding ballast in the undercarriage, which aims to lower the CoG position while reducing the percent margin of the load variation and thus constraining the variation of the CoG location. While such approaches are successful up to a certain extent, they also come with drawbacks, such as performance loss under normal driving conditions and reduced efficiency due to added weight.

To avoid designing conservative control methods for the worst-case scenario, and as CoG location is the most prominent factor in untripped rollover occurrences, the control performance benefits from real-time CoG location estimation capabilities. Such estimators can be used as a warning system to the driver or can be conveniently integrated into active road-handling or rollover prevention controllers, hence improving the overall vehicle and passenger safety.

Due to its importance, the CoG estimation problem has been researched concurrently with the rollover avoidance control problem, and the methods span from recursive linear least-squares (RLS) type methods, multiple-model estimation, and extended Kalman filters (EKF). However, the RLS and EKF methods need to use models that are linear, or nearly linear in the parameters, which is not true for the CoG estimation problem. Hence, such linear-in-parameter assumptions can lead to reduced performance of the estimator, ultimately violating safety in the vehicle rollover prevention system.

Conversely, some vehicle rollover prevention systems assume a known CoG height when designing the controller that is responsible for avoiding rollover, which is unrealistic since the CoG location changes with loading conditions and the type of maneuver being exercised. Such an assumption makes the control system suboptimal because to be safe to the most possible extent, it necessarily needs to be designed for a worst-case scenario, for a worst-possible CoG location.

Accordingly, there is still a need for a vehicle dynamics control system, such as roll-dynamics control suitable for rollover prevention based on real-time estimation of the CoG location.

SUMMARY

It is an objective of some embodiments to provide a system and a method for a vehicle dynamics control system suitable to prevent vehicle rollover. It is another objective of some embodiments to provide such a system and method that adapts to the center-of-gravity (CoG) location in real-time and hence adapts its control actuation depending on the CoG location. Additionally, or alternatively, it is another objective of some embodiments to adapt the CoG estimation in realtime concurrently with the controller. Additionally, or alternatively, it is another objective of some embodiments to adapt the CoG estimation concurrently with the state of the vehicle, as the measurements do not explicitly measure the CoG location.

Additionally, or alternatively, it is another objective of some embodiments to estimate the suspension parameters of the system with the CoG location. Additionally, or alternatively, it is another objective of some embodiments to provide such estimator in the form of a Bayesian filter. Additionally, or alternatively, it is another objective of some embodiments to design such estimator using a model of a vehicle that renders lower computational complexity while still representing the CoG estimation accurately. As used herein, the CoG includes the height of the CoG defining a distance from the CoG location to the ground. As used herein, the state of the vehicle includes a roll angle of the vehicle and a roll rate of the vehicle.

Some embodiments are based on the realization that the CoG location can be estimated based only on a model of the vehicle roll dynamics, which is simpler than also having a model of vehicle planar dynamics. The realization is based on the fact that while including a planar vehicle dynamics model accuracy is improved slightly, but the complexity of the algorithm needed to include such a model is increased exponentially. Hence, only including the vehicle roll dynamics leads to a small reduction of accuracy while gaining a substantial reduction in computational and algorithmic complexity.

However, such a reduction in computational complexity of the CoG estimation based only on the model of the vehicle roll dynamics necessitates the separation of the CoG estimation and dynamics control based on the estimated CoG. This is because the simplicity of the model of the vehicle roll dynamics may lead to inaccuracy of the actual control. To that end, some embodiments separate the CoG estimation and control of the vehicle dynamics by using different models for the execution of these tasks. Specifically, the CoG is estimated based on the vehicle roll dynamics model, while the control is performed based on a motion model that may or may not include the vehicle roll dynamics model. For example, the motion model can include a planar model of the dynamics of the vehicle.

One embodiment is based on the realization that the vehicle roll dynamics can be represented as a torsional spring-damper model having three unknown parameters: The CoG location, and spring and damping coefficients. Another embodiment is based on the understanding that while the CoG location is the main parameter of interest to rollover prevention systems, the suspension dynamics of a vehicle heavily influence the motion of the CoG location. As a result, for accurate CoG estimation also parameters of the suspension dynamics are essential to be estimated.

Some embodiments are based on the understanding that the output of the roll dynamics is the roll rate and the roll angle, which enter linearly into the motion model, whereas the unknown CoG location, and spring and damping coefficients enter in the motion model nonlinearly. In one embodiment this realization is used to leverage a linear substructure in the roll dynamics, which enables an efficient implementation that estimates the roll rate and roll angle analytically while estimating the CoG location, and spring and damping coefficients numerically based on the analytic estimation of the roll rate and roll angle.

In one embodiment the estimation of the CoG location, and spring and damping coefficients is done using a Bayesian filter. A Bayesian filter produces not only an estimate of the parameters of interest but also a probability distribution of uncertainty of the said parameters. In one embodiment this probability distribution is used to control the vehicle to avoid rollover.

Some embodiments implement the Bayesian filter using a particle filter, wherein a particle includes a sample of the CoG location, and spring and damping coefficients, an estimate of the vehicle state based on the sample, and a weight of probability of the samples. Using a particle filter avoids the need for the linear or near-linear assumption of the dynamics.

Some embodiments utilize the fact that as more data (i.e., measurements) are gathered, the probability distributions of the uncertainty of the parameters shrink since more data means more information at hand to produce the estimates. Confidence intervals of the uncertainty of the parameters can be deduced from the estimation of the probability distribution, and in one embodiment an uncertainty-aware controller uses the estimate of the CoG location as well as the confidence of the estimation of the CoG location to determine a control command to avoid rollover. In some embodiments, the likelihood of rollover is determined using the associated CoG confidence.

Some embodiments are based on the realization that rollover prevention can be formulated in terms of constraints on vehicle states and parameters that should be satisfied for rollover to be avoided. Such constraints depend on the CoG location as well as the vehicle state.

Some embodiments disclose a parameter adaptive controller capable of satisfying constraints on the maneuvering of the vehicle while avoiding vehicle rollover. In one embodiment, such constraint enforcement is done by so-called constraint admissible sets, which guarantee a certain probability that constraints are satisfied.

Some embodiments provide sampling-based approaches to generate features and labels off-line, iteratively update the robust constraint admissible sets on-line as more data becomes available and the confidence in the parameter estimates improves. In order to construct robust constraint admissible sets, some embodiments use not only the point estimates of the parameters themselves but also regions in the parameter space within which the true parameter lies with high confidence, ascertained by a probability. To this end, some embodiments provide the use of a Bayesian filter to determine the confidence.

For some vehicle control applications, there are usually already existing controllers that for various purposes are not easily replaced or redesigned. In such cases, reference governors are useful. Reference governors are light-weight constraint enforcement controllers that can be used as add-on schemes to already deployed controllers. One embodiment discloses a parameter adaptive reference governor that learns online constraint-admissible sets by leveraging the parameter information from the Bayesian filter.

Some embodiments of the present disclosure are based on a recognition that reference governors provide an effective method for ensuring safety via constraint enforcement in closed-loop control systems. When the parameters of the underlying systems are unknown, as is the case for the CoG location, robust formulations of reference governors that consider only the worst-case effect may be overly conservative and exhibit poor performance. To that end, some embodiments disclose a parameter adaptive reference governor architecture that is capable of generating safe control commands in spite of CoG uncertainties without being as conservative as robust reference governors. Some embodiments use a Bayesian filter to produce confidence bounds around the parameter estimates, which are fed to supervised machine learners for approximating robust constraint admissible sets leveraged by the parameter adaptive reference governor. While initially, due to the absence of online data, the parameter adaptive reference governor may be as conservative as a robust reference governor, as more data are gathered and the confidence bounds become tighter, conservativeness reduces.

Accordingly, one embodiment discloses a vehicle dynamics control system, including at least one processor; and memory having instructions stored thereon that, when executed by at least one processor, cause the vehicle dynamics control system to: receive a feedback state signal indicative of measurements of a state of a motion of a vehicle controlled by a vehicle controller, the state includes values of a roll rate and a roll angle in the vehicle; update one or multiple parameters of a model of roll dynamics of the vehicle by fitting the received values of the roll rate and the roll angle into the roll dynamics model, wherein the roll dynamics model is a spring-damper model that explains an evolution of the roll rate and the roll angle based on the parameters including a center of gravity (CoG) parameter modeling a location of a CoG of the vehicle, and a spring constant and a damping coefficient modeling suspension dynamics of the vehicle, and wherein the updated parameters include the CoG parameter; determine, based on the state of the vehicle, a control command for controlling at least one actuator of the vehicle using a motion model including the updated CoG parameter; and submit the control command to the vehicle controller to control the motion of the vehicle based on the control command.

Some other embodiments disclose a vehicle rollover prevention method that is executed by at least one processor connected to the vehicle. The method estimates, using a Bayesian filter, one or multiple internal states of a vehicle roll dynamics model that includes the vehicle CoG location. Using the estimated CoG location, the method determines a control command to reduce the likelihood of a rollover and submits the control command to at least one component of the vehicle.

BRIEF DESCRIPTION OF THE DRAWINGS

FIG. 4F shows possible assigned probabilities of the five different CoG parameters at the first iteration in FIG. 4E.

DETAILED DESCRIPTION

Figure 1A:
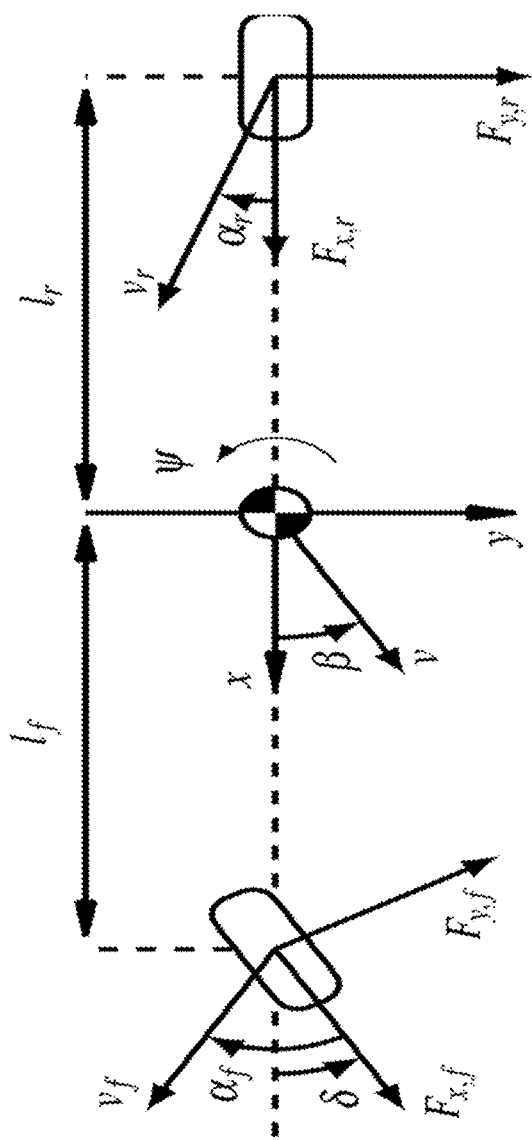
FIG. 1A shows a schematic of the model of vehicle planar dynamics.

FIG. 1A shows a schematic of the model of vehicle planar dynamics used by some embodiments. The vehicle planar dynamics model describes the time evolution of the vehicle longitudinal motion, lateral motion, and heading, i.e., the vehicle planar dynamics model is a particular example of a motion model of a vehicle. The heading $\psi$ describes the rotation of the vehicle about an axis that is perpendicular to the vehicle's forward axis x and lateral axis y. In the case of FIG. 1A, the vehicle model, i.e., the vehicle planar dynamics, combines the two wheels on the same axle into one, effectively making it a bicycle model. However, the same illustration applies to a four-wheel vehicle model. The model in FIG. 1A illustrates a model that is widely used in vehicle control. However, it does not capture the roll dynamics of the vehicle and is therefore not useful as a stand-alone model for vehicle-dynamics control systems that aim to control the vehicle under nonnegligible roll motion of the vehicle, e.g., the controlling of a sports utility vehicle (SUV) having aggressive steering maneuvers.

Figure 1B:
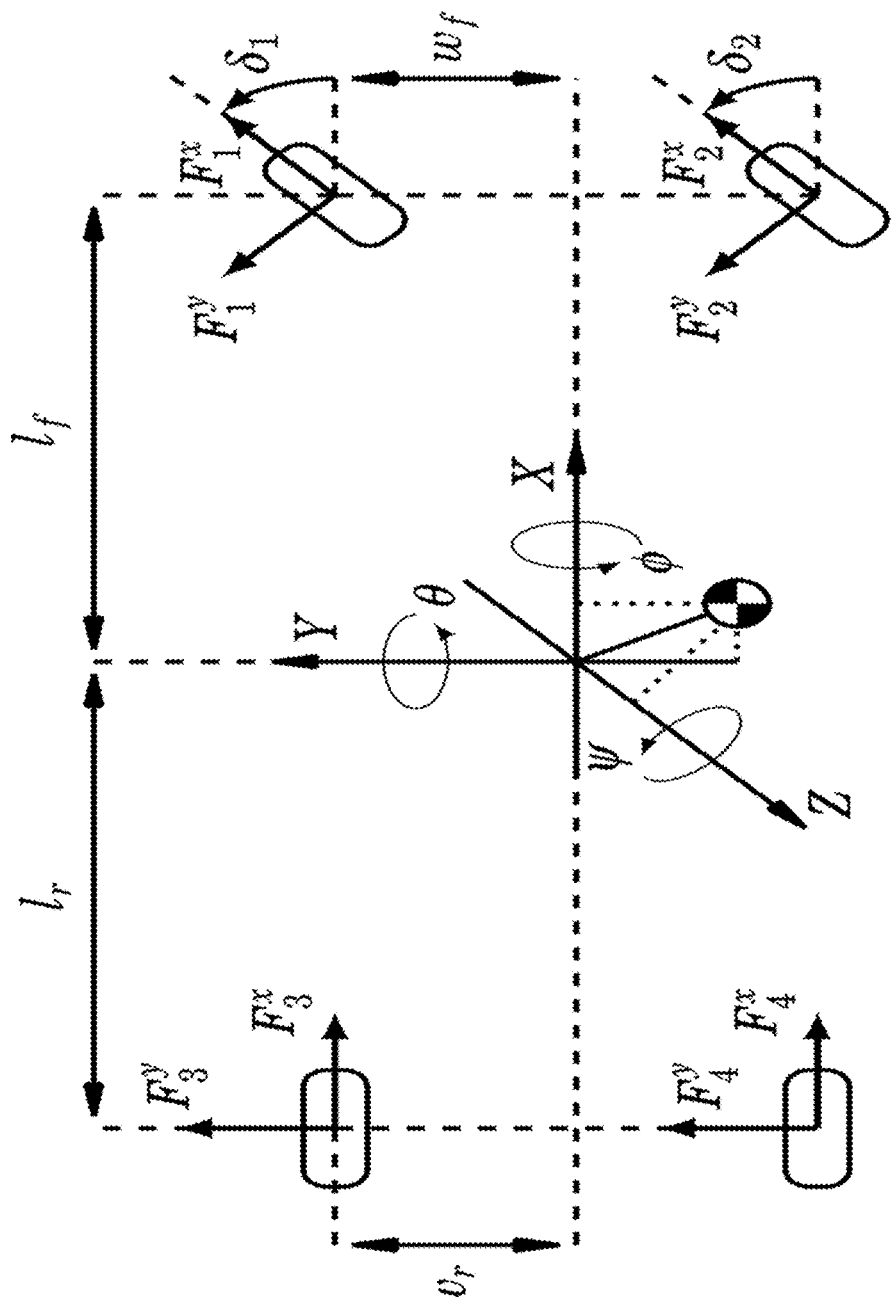
FIG. 1B shows a model, wherein four wheels are modeled, as well as the dynamics for the roll and pitch.

FIG. 1B shows a more complex model, wherein four wheels are modeled, as well as the dynamics for the roll $\phi$ and pitch $\theta$. The mathematical equations underlying the schematic in FIG. 1B includes the roll dynamics and can therefore be used to estimate the CoG height in a recursive fashion, e.g., using a Kalman filter-type method or a recursive least-squares type method, or any other recursive method applicable to the particular estimation problem.

Figure 1C:
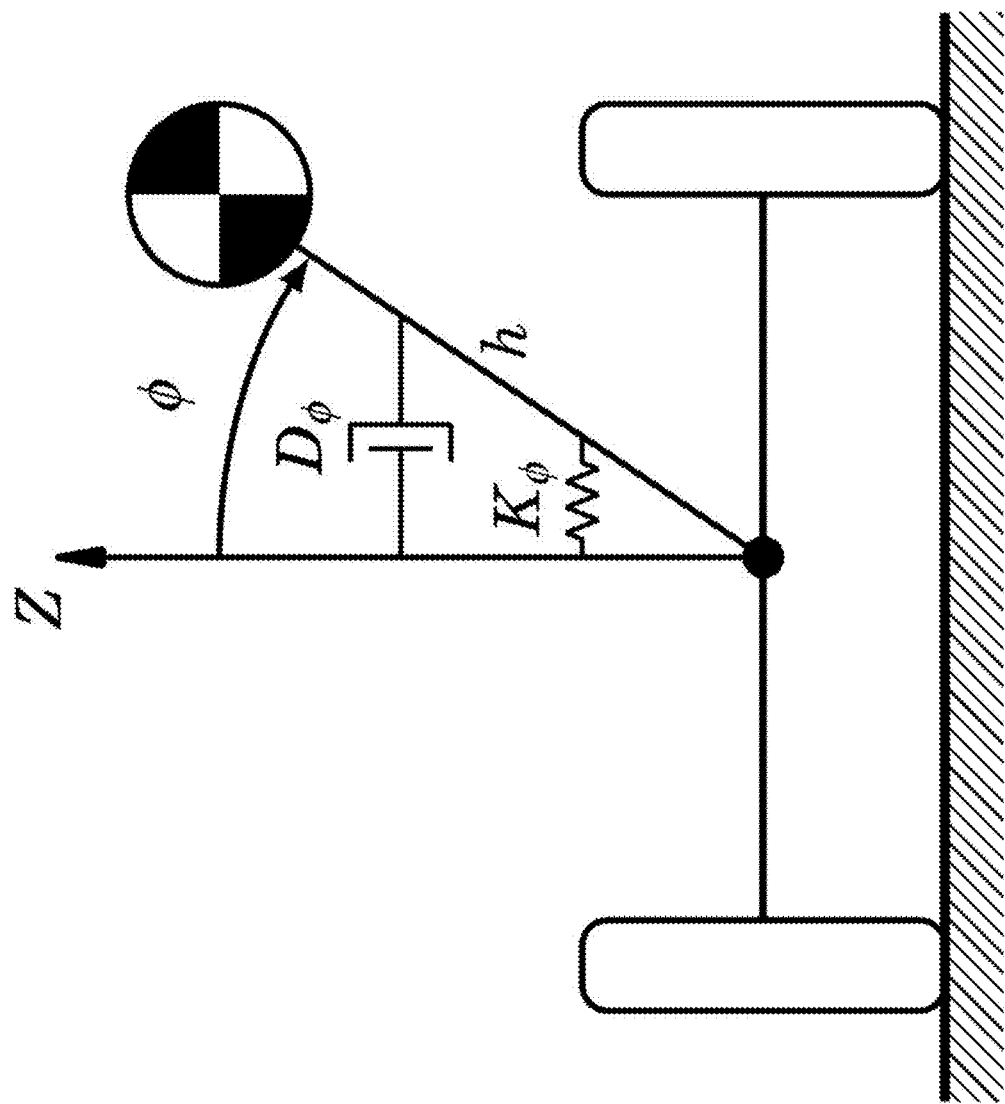
FIG. 1C shows an alternative schematic of a model only including the vehicle roll dynamics.

FIG. 1C shows an alternative schematic of a model only including the vehicle roll dynamics, wherein the model governing the roll motion is a torsional spring-damper system modeling the CoG height h, spring constant K, and damping coefficient D. As used herein, the roll motion is described by a vehicle state including the roll rate of the vehicle and the roll angle of the vehicle. For the model in FIG. 1C there are in total three parameters, the CoG height h, spring constant K, and damping coefficient D, of main interest for control of the vehicle roll dynamics, e.g., to avoid vehicle rollover.

The model in FIG. 1C is substantially simplified compared to FIG. 1B. For instance, the model illustrated by FIG. 1B necessitates the need for modeling the vehicle tire to road interaction, because the tire forces are essentially what govern the planar dynamics. Hence, if excluding the pitch dynamics, the number of parameters needed to estimate increases to at least seven compared to three for the model illustrated in FIG. 1C.

Different vehicle dynamics models capture different aspects of vehicle dynamics and are therefore suitable for different purposes. For instance, when controlling the heading rate of a vehicle and assuming that the vehicle is aligned with the road, a planar dynamics model is sufficient for controlling the vehicle. However, the assumption of a vehicle being aligned with the road is sometimes difficult to verify a priori. For instance, when driving on dry asphalt the friction between tire and road is large such that steering maneuvers intended for controlling the heading rate of a vehicle lead to large roll angles such that using a vehicle planar dynamics model alone as a motion model when controlling the vehicle can be insufficient.

In cases of roll angles being large such that the CoG location of a vehicle changes more than marginally, it is beneficial for a control system controlling the dynamics of the vehicle, i.e., a vehicle dynamics control system, to also include a parameter modeling CoG location of the vehicle.

Figure 1D:
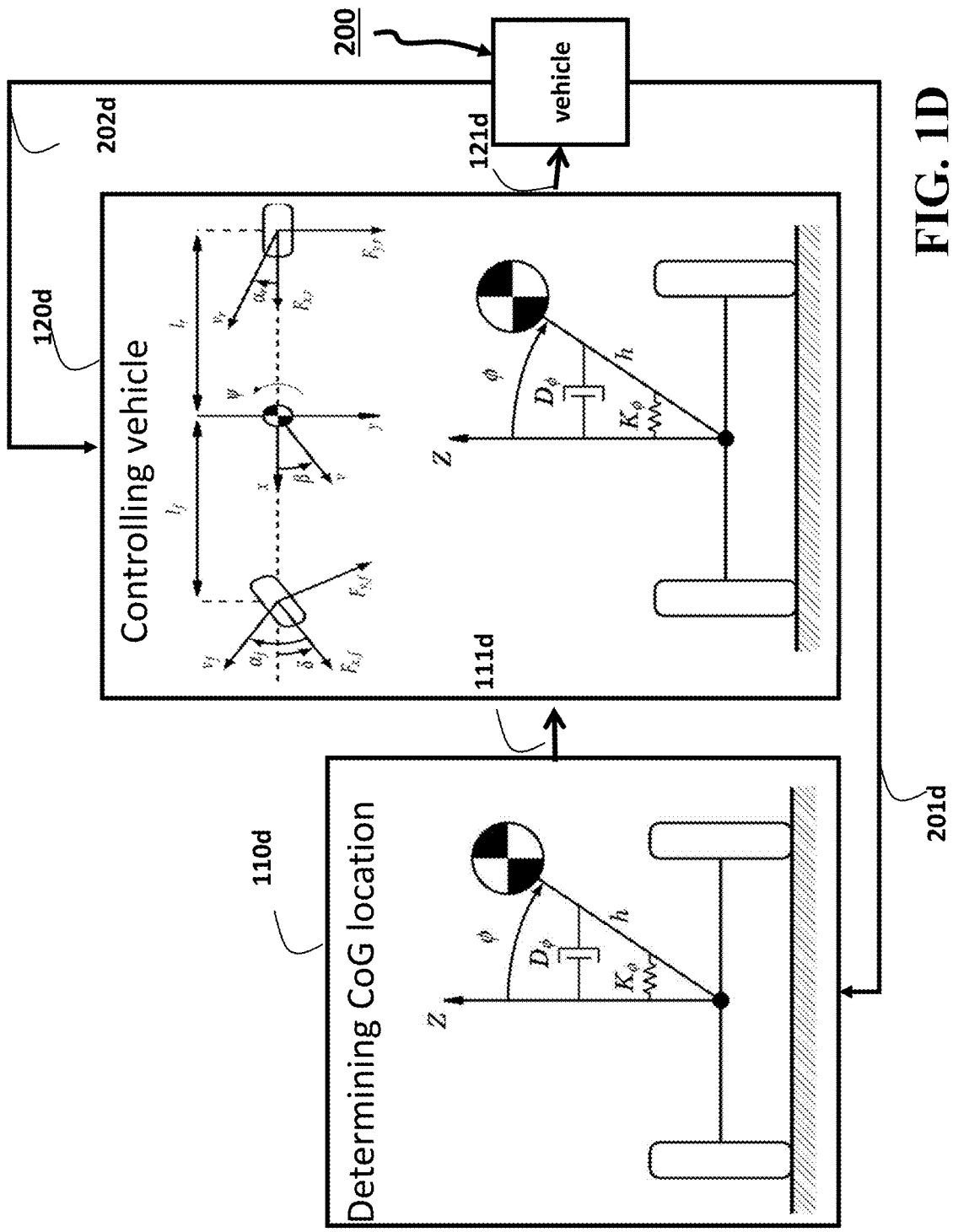
FIG. 1D shows an example of interactions of different vehicle models according to some embodiments.

Besides, different vehicle models can have different purposes. FIG. 1D shows an example of interactions of different vehicle models according to some embodiments and how they can fit different purposes in a vehicle-dynamics control system for controlling a vehicle 200.

For instance, some embodiments recognize that while a complex vehicle model, such as in FIG. 1B, inevitably can lead to accurate modeling of the vehicle, such a model increases complexity while not necessarily adding much modeling improvement. For instance, when controlling a vehicle 200 using a controller 120d, one embodiment uses a motion model of vehicle dynamics that include the roll dynamics of the vehicle and the planar dynamics of the vehicle, wherein the roll dynamics model is a spring-damper model having the CoG location as a parameter. However, when updating 110d the CoG location 111d for control 120d, one embodiment uses only a model of roll dynamics that explains the evolution of the roll rate and the roll angle based on the parameters including a CoG parameter modeling a location of a CoG of the vehicle and a spring constant and a damping coefficient modeling suspension dynamics of the vehicle. In other words, updating one or multiple parameters of a model of roll dynamics of the vehicle can be done with a simple roll-dynamics model, whereas the updated parameters can be sent 111d to the vehicle controller 120d that can use such parameters for determining control commands 121d to the vehicle.

Different models can be used for different purposes and need different information from the sensors measuring aspects of the vehicle operation. For instance, for updating the CoG parameter some embodiments use a lateral acceleration measurement, a roll rate measurement, and a roll angle measurement, which are sensed by sensors mounted on the vehicle 200 and whose measurements 201d are used when updating the CoG parameter. However, for the purpose of controlling 120d the vehicle, some embodiments use measurements 202d that includes other aspects of vehicle dynamics, such as measurements of heading rate, vehicle velocity, wheel speeds, and vehicle position.

Other embodiments are based on the recognition that there is not only an interaction between different models relating to the estimation of CoG parameters and the controlling of the vehicle but also different models are used for different aspects of estimation.

E.g., vehicle sensor setups can measure the relevant states needed for control, e.g., a gyroscope included in an inertial measurement unit (IMU) can measure the heading rate of a vehicle, a global positioning system (GPS) receiver can measure a vehicle position. However, GPS can only measure vehicle position within a few meters precision, and automotive-grade IMUs are imprecise. Hence, some embodiments utilize different estimators for estimating various aspects of vehicle operation.

Figure 1E:
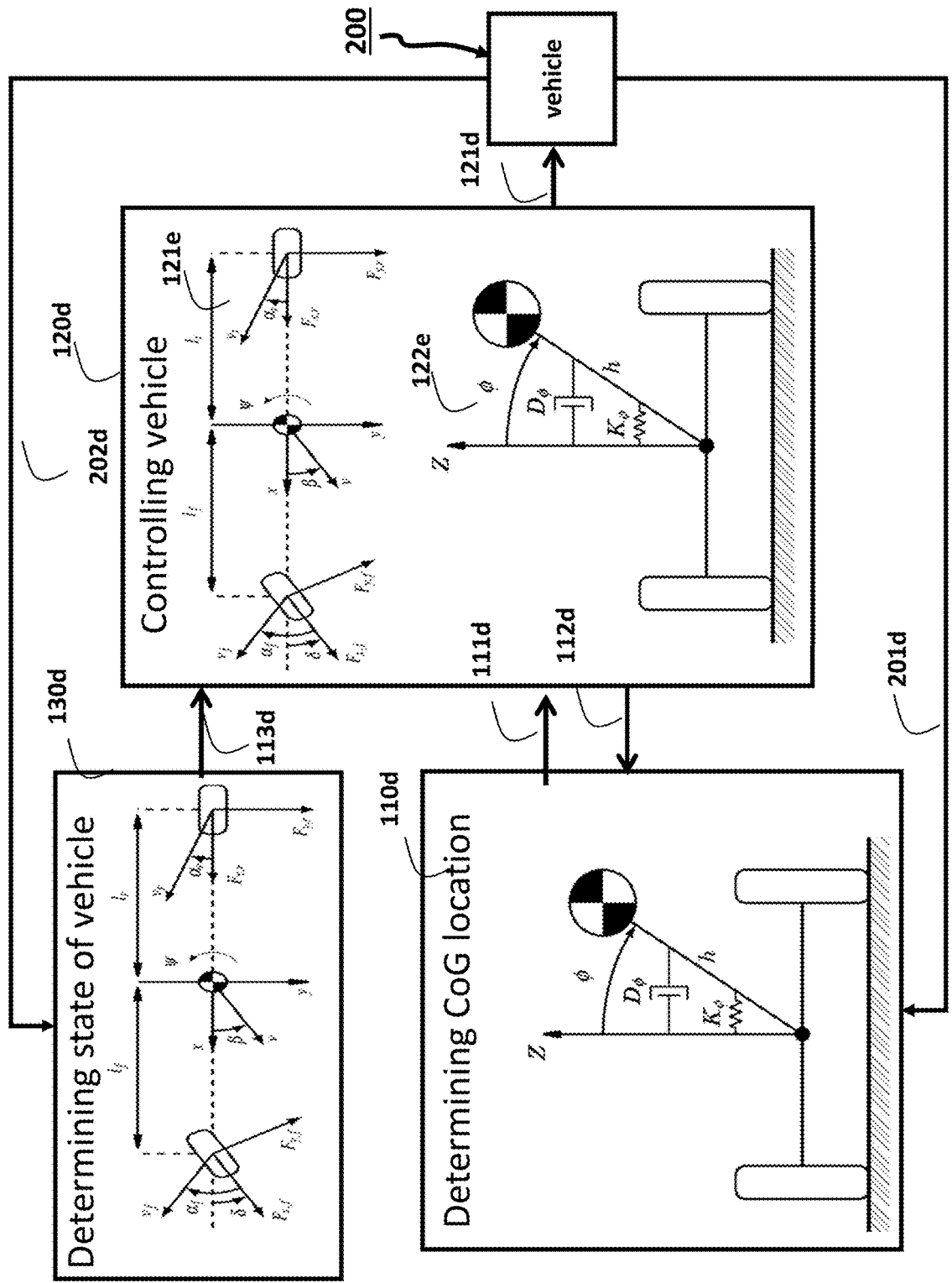
FIG. 1E shows the interaction of various vehicle motion models according to one embodiment.

FIG. 1E shows the interaction of various vehicle motion models according to one embodiment. For example, the controller 120d determining the control command 121d can include a combination of a vehicle planar dynamics model 121e of the vehicle and a model of roll dynamics 122e of the vehicle. Although shown in FIG. 1E as two different vehicle models, the vehicle model illustrated in FIG. 1B including joint modeling of planar dynamics and vehicle roll dynamics including a CoG parameter can be included in the controller 120d. The determining 110d of CoG parameter can include a vehicle roll dynamics model as a spring-damper model where the CoG parameter includes a CoG location, spring constant, and a damping coefficient. At the same time, the vehicle state, such as a vehicle velocity, vehicle position, vehicle heading, and heading rate of a vehicle, can be estimated 130d using a planar model 121e of vehicle dynamics.

Figure 2A:
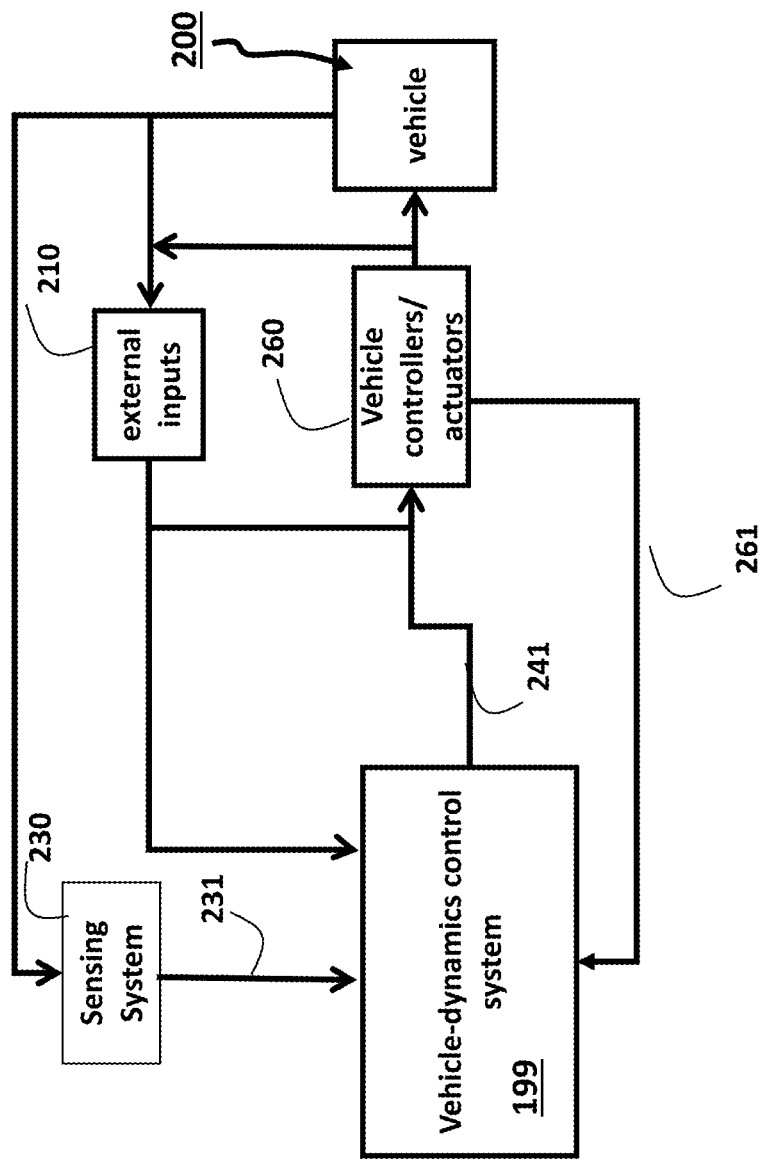
FIG. 2A shows the interaction of a vehicle dynamics control system with other system components of a vehicle according to some embodiments.

FIG. 2A shows the interaction of a vehicle dynamics control system 199 with other system components of a vehicle 200 according to some embodiments. The vehicle can be any type of moving vehicles, such as a four-wheeled passenger car or a mobile robot. The vehicle can be entirely human-operated, semi-autonomous, or fully autonomous. E.g., the vehicle can receive external inputs 210 from a driver of the vehicle generating a reference steering command and/or braking/throttle command to the vehicle. E.g., the vehicle can receive external inputs 210 from an autonomous-driving system of the vehicle generating a reference steering command and/or braking/throttle command to the vehicle. The vehicle dynamics control system 199 can be connected to a sensing system 230 that outputs various sensor measurements 231, such as lateral acceleration, steering command, velocity, or sensing of the suspension system of the vehicle. The sensing system 230 can include GPS and/or an IMU. E.g., the IMU can comprise a 3-axis accelerometer(s), 3-axis gyroscope(s), and/or magnetometer(s). The IMU can provide velocity, orientation, and/or other position-related information to other components of the vehicle dynamics control system 199. For example, the sensing system 230 can include a sensor for measuring or estimating the roll angle of the vehicle and the roll rate of the vehicle.

The vehicle dynamics control system 199 determines a control command 241 to low-level actuators and controllers 260 of the vehicle. The vehicle-dynamics control system can actuate various actuators of the vehicle. The control command 241 can be modified steering command modifying the drivers' 210 reference input to avoid violating the constraints of the vehicle, or it can be the braking commands of the individual tires. The command 241 is used as an input, or reference, to the vehicle controllers 260 to compute vehicle commands, such as steering, brake, and throttle. Those commands are submitted to the actuators of the vehicle to move the vehicle according to command 241.

If the motion model of the vehicle contained in the vehicle-dynamics control system 199 uses the same control inputs as the actual vehicle, the vehicle can be controlled directly using the computed inputs. E.g., if the vehicle 200 is controlled by applying steering and engine torque, and if the control model used in the vehicle dynamics control system 199 also uses steering and engine torque as control inputs, these can be applied directly to the vehicle, thereby overriding the vehicle-control system 260. However, because the mathematical description of the vehicle 200 used, e.g., mathematical description corresponding to the model in FIG. 1B, in the vehicle dynamics control system 199 often is a simplification of the true motion of the vehicle, the control inputs 241 can instead be used as feedforward, or nominal, control signals together with references as inputs to the vehicle-control system 260. E.g., accelerations can be modeled to be proportional to the engine torque. Hence, if accelerations are used as inputs in the motion model of the vehicle employed in the vehicle dynamics control system 199, the accelerations can be used as scaled feedforward inputs to the vehicle-control system 260.

In some implementations, the vehicle-dynamics control system 260 can include a steering controller, a brake controller, and a throttle controller, wherein the steering controller takes a steering angle as input, the brake controller takes a reference deceleration or wheel slip as input, the engine controller takes a nominal velocity or acceleration as input, all controllers output torques, and the vehicle-dynamics control system 199 includes all of these entities. Then, the torques computed by the vehicle-dynamics control system 199 can either circumvent the vehicle controllers 260, or the torques 241 can be used as zero-level values of the vehicle controllers 260, and the steering angle, the reference deceleration or wheel slip, and the nominal velocity or acceleration can be used as references 241 to the vehicle controllers 260.

Some embodiments use a motion model of the vehicle for controlling the vehicle, wherein the motion model does not include the spring constant and the damping coefficient of the roll dynamics model. This is because the CoG location is the key parameter for controlling a vehicle to avoid rollover, and a motion model controlling the roll of the vehicle must include a CoG location.

In other embodiments, the motion model used when controlling the vehicle includes the planar dynamics of the vehicle. E.g., when a rollover is the only control objective, a vehicle roll dynamics model is sufficient for control so some embodiments include the roll dynamics into the motion model. However, when controlling the other states of a vehicle, such as position, heading rate, or velocity, other models are included. E.g., in one embodiment the motion model used for controlling the vehicle includes the planar dynamics model of the vehicle.

Some embodiments are based on the understanding that sensor measurements are noisy, and such noise is probabilistic, i.e., it can be described by statistics. To this end, some embodiments use probabilistic, i.e., Bayesian, filters, to update one or multiple parameters of a model of roll dynamics of the vehicle. Using Bayesian filters enable to extract of various moments, e.g., first and second moments, of the determined probability distribution, and such moments can be used when determining the control command. E.g., the second moment, i.e., the variance, of the updated CoG location can be used to determine control commands such that the vehicle is behaving safely for CoG locations within the variation of the possible CoG locations.

Figure 2B:
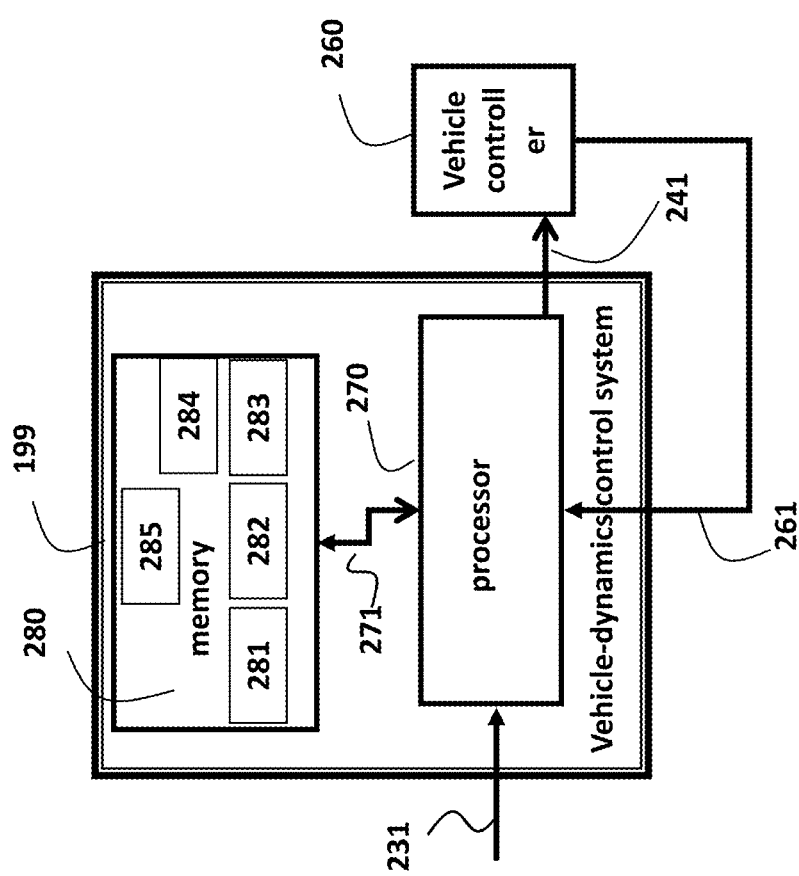
FIG. 2B shows a general structure of the vehicle-dynamics control system according to one embodiment of the invention.

FIG. 2B shows a general structure of the vehicle-dynamics control system 199 according to one embodiment. The vehicle-dynamics control system 199 includes at least one processor 270 for executing instructions of the vehicle-dynamics control system 199 stored in a memory 280. The processor 270 is connected 271 to a memory 280 for storing a Bayesian filter 281 that uses sensing information 231 and a model of vehicle roll dynamics. The memory also stores 282 an initial guess of the distribution of one or more parameters of the vehicle roll dynamics, e.g., including a spring stiffness constant of the dynamics, a damping coefficient, and a CoG location of the vehicle, and 283 a motion model including the CoG parameter. The memory also stores 284 the constraints of the vehicle, and a controller with components 285 for determining control commands satisfying such constraints. For example, the memory can store 285 constraint-admissible invariant sets that, when used in a controller, can guarantee constraint satisfaction. In one embodiment, the vehicle-dynamics control system determines such sets based on the estimates from the Bayesian filter according to various embodiments of the invention.

Figure 3A:
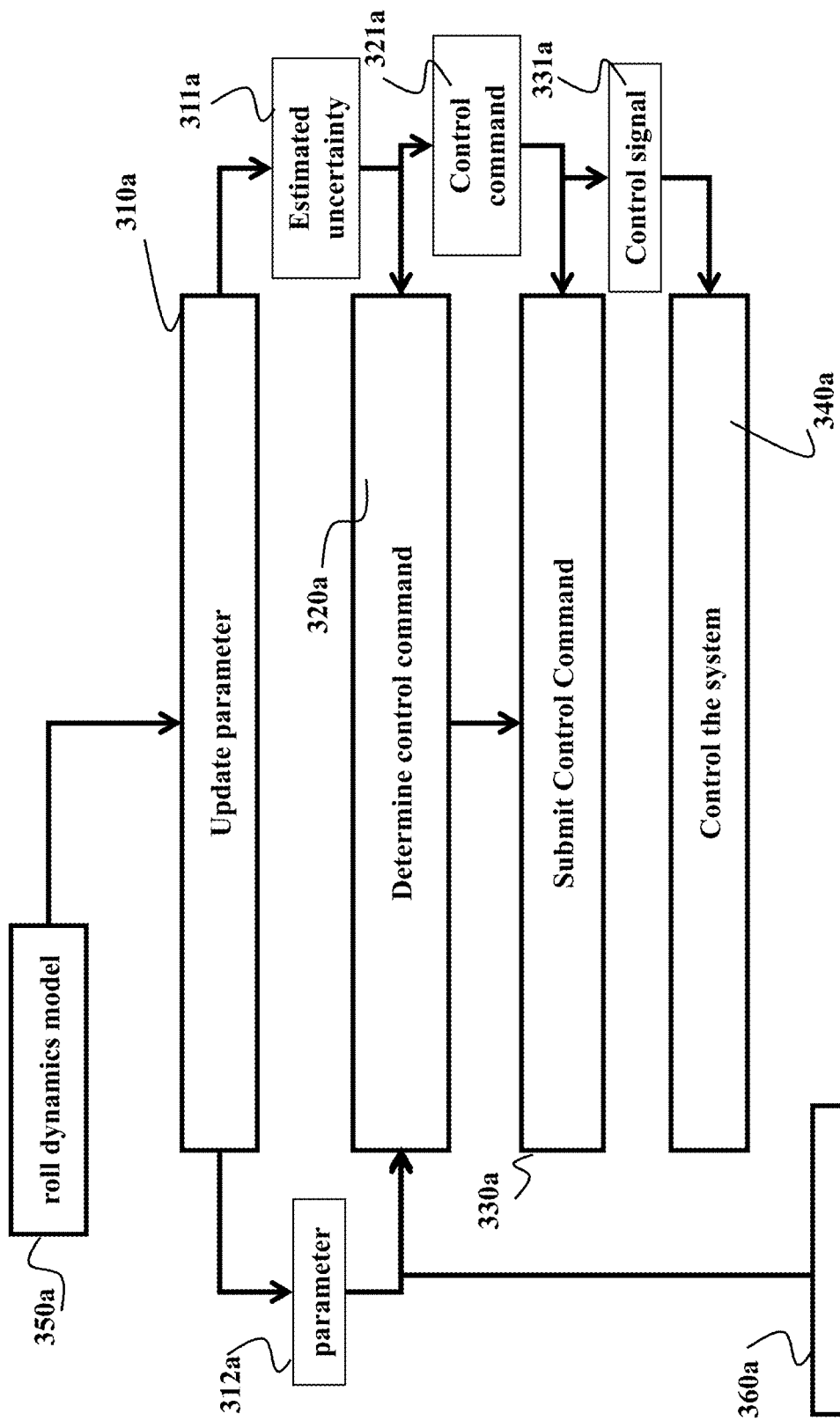
FIG. 3A shows a block diagram of a method for controlling the vehicle dynamics including a CoG parameter of a vehicle according to some embodiments.

FIG. 3A shows a block diagram of a method for controlling the vehicle dynamics including a CoG parameter of a vehicle according to some embodiments, wherein the method is executed by at least one processor 270 of the vehicle. The method estimates 310a one or multiple parameters of a vehicle roll dynamics model 350a including the CoG parameter modeling a location of a CoG of the vehicle and a spring constant and a damping coefficient modeling suspension dynamics of the vehicle by fitting measurements of at least one or a combination of a roll rate and a roll angle in the vehicle roll dynamics model. In some embodiments, the method uses a Bayesian filter that also estimates the confidence intervals of the parameters. In other embodiments, the Bayesian filter also estimates a probability distribution of the uncertainty of the parameters. Using the estimated parameter 312a and the estimated uncertainty 311a of the internal states, the method determines 320a a control command 321a for controlling at least one actuator of the vehicle using a motion model 360a including the updated CoG parameter; and submits 330a the control command 321a by virtue of a control signal 331a to the vehicle. Finally, using the vehicle controller 260, the method controls 340a the motion of the vehicle according to the control command. In some embodiments, the purpose of control is to reduce a likelihood of a rollover of a vehicle having the estimated CoG.

In other embodiments, the Bayesian filter estimates not only the CoG parameter but also an estimate of the uncertainty of the CoG parameter. In some embodiments, the estimate of the CoG parameter is a general probability distribution, in other embodiments, the estimate of the CoG parameter is done by assuming the CoG parameter uncertainty is following a Gaussian distribution. In other embodiments, the Bayesian filter uses measurements of the roll rate and the roll angle of the vehicle using the sensing system 230.

Some embodiments are based on the realization that the parameters including a CoG parameter modeling a location of a CoG of the vehicle and a spring constant and a damping coefficient modeling suspension dynamics of the vehicle can be estimated based only on a model of the vehicle roll dynamics, which is simpler than also having a model of vehicle planar dynamics. The realization is based on the understanding that while including a planar vehicle dynamics model, accuracy is improved slightly. However, the complexity of the algorithm needed to include such a model is increased exponentially. Hence, only including the vehicle roll dynamics leads to a small reduction of accuracy while gaining a substantial reduction in computational and algorithmic complexity.

One embodiment is based on the realization that the vehicle roll dynamics can be represented as a torsional spring-damper model having three unknown parameters: the CoG location, and spring and damping coefficients. Another embodiment is based on the understanding that while the CoG location is the main parameter of interest to vehicle-dynamics control systems focusing on rollover prevention, the suspension dynamics of a vehicle heavily influence the motion of the CoG location. As a result, for accurate CoG estimation also parameters of the suspension dynamics are essential to be estimated.

Figure 3B:
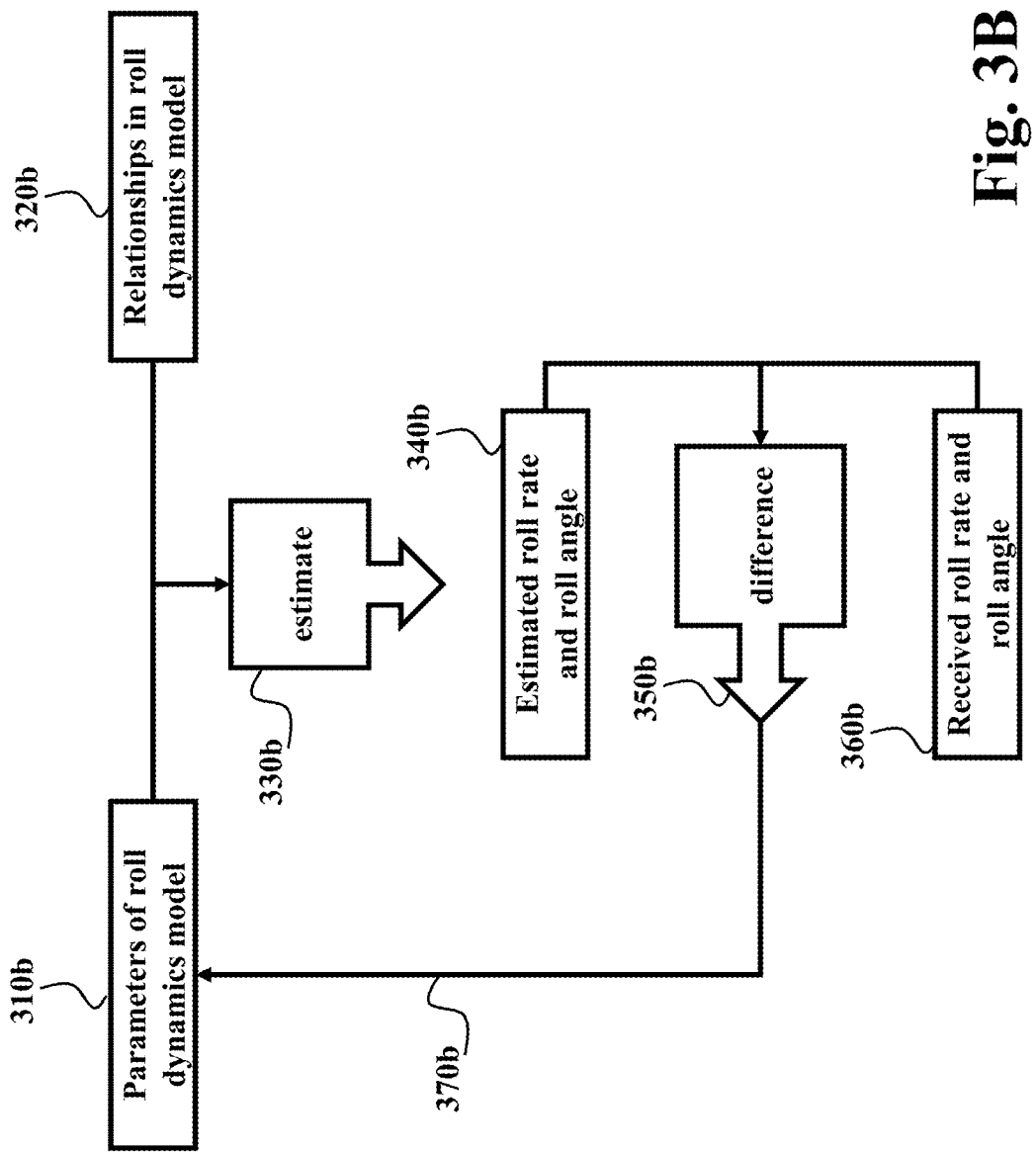
FIG. 3B shows a schematic of fitting the received values of the roll rate and the roll angle into the roll dynamics model to update one or multiple parameters of a model of roll dynamics of the vehicle according to some embodiments.

FIG. 3B shows a schematic of fitting the received values of the roll rate and the roll angle into the roll dynamics model to update one or multiple parameters of a model of roll dynamics of the vehicle according to some embodiments. The roll dynamics model includes parameters 310b and the relationships 320b connecting the parameters 310b with outputs of the roll dynamics. In various embodiments, parameters 310b include one or a combination of a CoG parameter modeling a location of a CoG of the vehicle, and a spring constant and a damping coefficient modeling suspension dynamics of the vehicle. The outputs of the roll dynamics in the roll dynamics model include the roll rate and the roll angle of the vehicle. Hence, knowing the parameters 310b of the roll dynamic model it is possible to estimate the values of the roll rate and the roll angle 340b according to the relationship 320b. Examples of the relationships 320b include a roll dynamics model having the parameters inserted into the model, wherein the values are the outputs of the roll dynamics model with the parameters inserted into the model.

To that end, the update 370b of the parameters 310b leads to different values of the estimated roll rate and roll angle 340b, which can be compared with the values of the roll rate and roll angle 360b received in a feedback signal to determine a difference 350b between the estimated 340b and the received 360b values of the roll rate and roll angle. Knowing the difference 350b, various embodiments update 370b one or multiple of the parameters 310b to reduce the difference 350b. Various techniques can be used to estimate the direction and the magnitude of the update 370b. For example, some embodiments determine the update 370b of the parameters using a Bayesian filter, by fitting measurements of at least one or a combination of a roll rate and a roll angle in the vehicle roll dynamics. Other embodiments use optimization-based techniques, such as gradient descent, to minimize the error between the outputs of the roll dynamics model and measurements of the roll rate and roll angle.

Figure 4A:
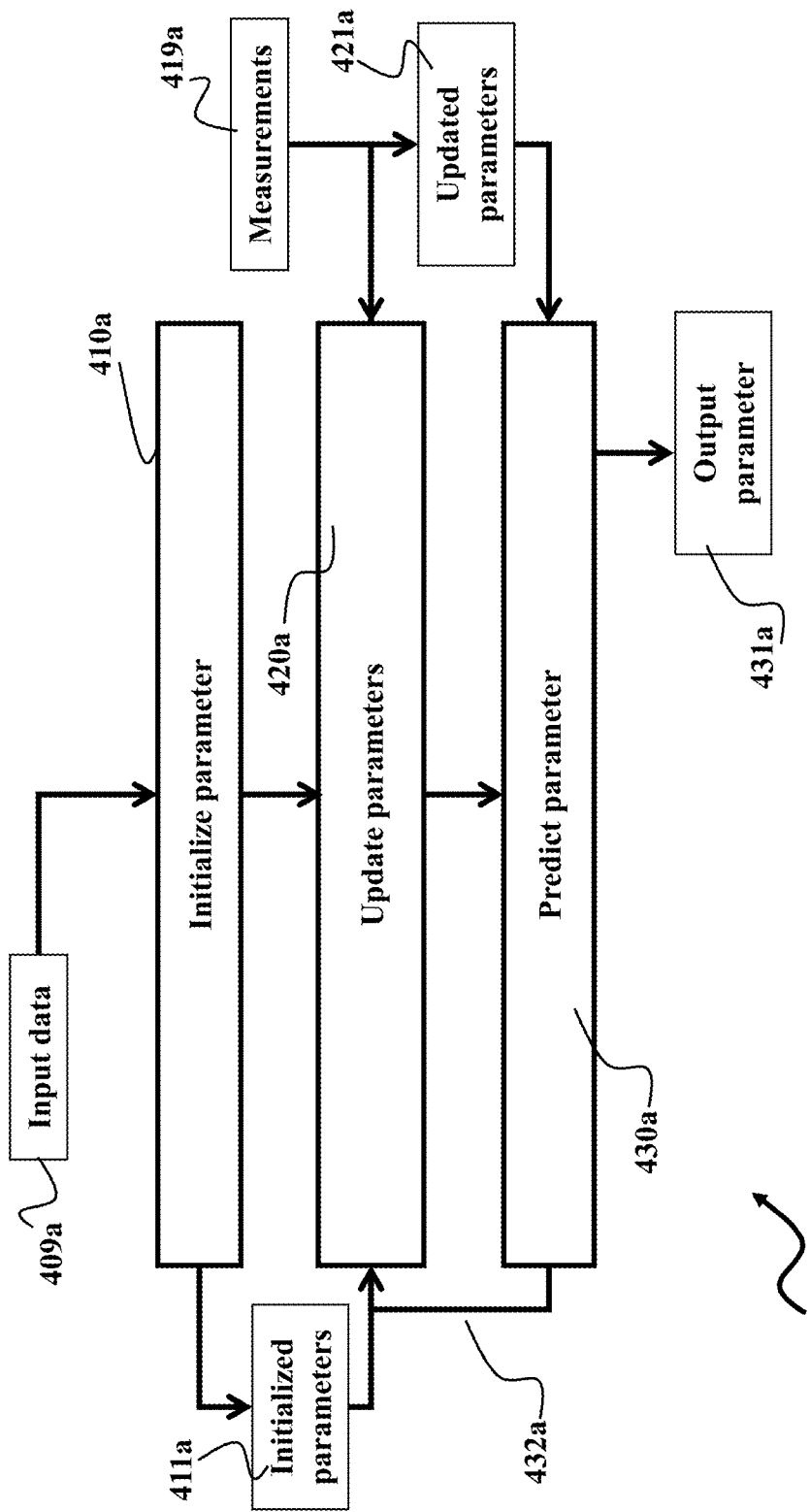
FIG. 4A shows a flowchart of a method for estimating one or multiple parameters including a CoG parameter of the vehicle by fitting measurements of at least one or a combination of a roll rate and a roll angle in the vehicle roll dynamics using a Bayesian filter according to some embodiments.

FIG. 4A shows a flowchart of a method for estimating 310a one or multiple parameters including a CoG parameter of the vehicle by fitting measurements of at least one or a combination of a roll rate and a roll angle in the vehicle roll dynamics using a Bayesian filter, wherein the CoG parameters is estimated probabilistically as a probabilistic distribution using a Bayesian filter, and wherein the motion model includes first and second-order moments of the probabilistic distribution of the CoG parameter capturing an uncertainty of estimation of the CoG parameter, such that the control command is determined based on the uncertainty of the CoG estimation. At the first time step, the method initializes 410a the estimates of parameters using input data 409a acquired according to other embodiments. Then, using measurements 419a from the sensing system 230, the method updates 420a the estimates of one or multiple parameters by fitting the measurements in the vehicle roll dynamics model that connects the measurements to the parameters. Using the updated estimates 421a of parameters, the method predicts 430a the parameters to the next time step and sends the predicted parameters 432a. Additionally, the method outputs 431a the parameters for using when determining a control command for controlling the vehicle.

Initialization of the estimate of the parameters can be done in numerous ways. For instance, if the vehicle dynamics control system is to be used for a specific vehicle model, or a specific type of vehicle, ranges of possible values of the parameters can be determined and bounded beforehand, from which initialization can be done, e.g., by sampling a value from a probability distribution that models the a priori range. However, there are two problems with such an approach. First, the range of values can be very large such that testing all values is impossible for computational reasons. Second, while it is possible to sample a finite set of values by modeling a probability distribution over the possible range of values, how to model such a distribution that captures the underlying true uncertainty of parameters is difficult.

One embodiment recognizes that if there are prior measurements available, e.g., collected using a vehicle driven by a human operator for the same type of vehicle, these measurements can be used in combination with a model of the roll dynamics of the vehicle and test different values of internal states to compare the fit to the measurements.

Some embodiments determine the initial guess by optimizing a cost function minimizing the difference between the measurement sequence and a set of estimated measurements using a model of the roll dynamics of the vehicle having hypotheses of the internal states.

Figure 4B:
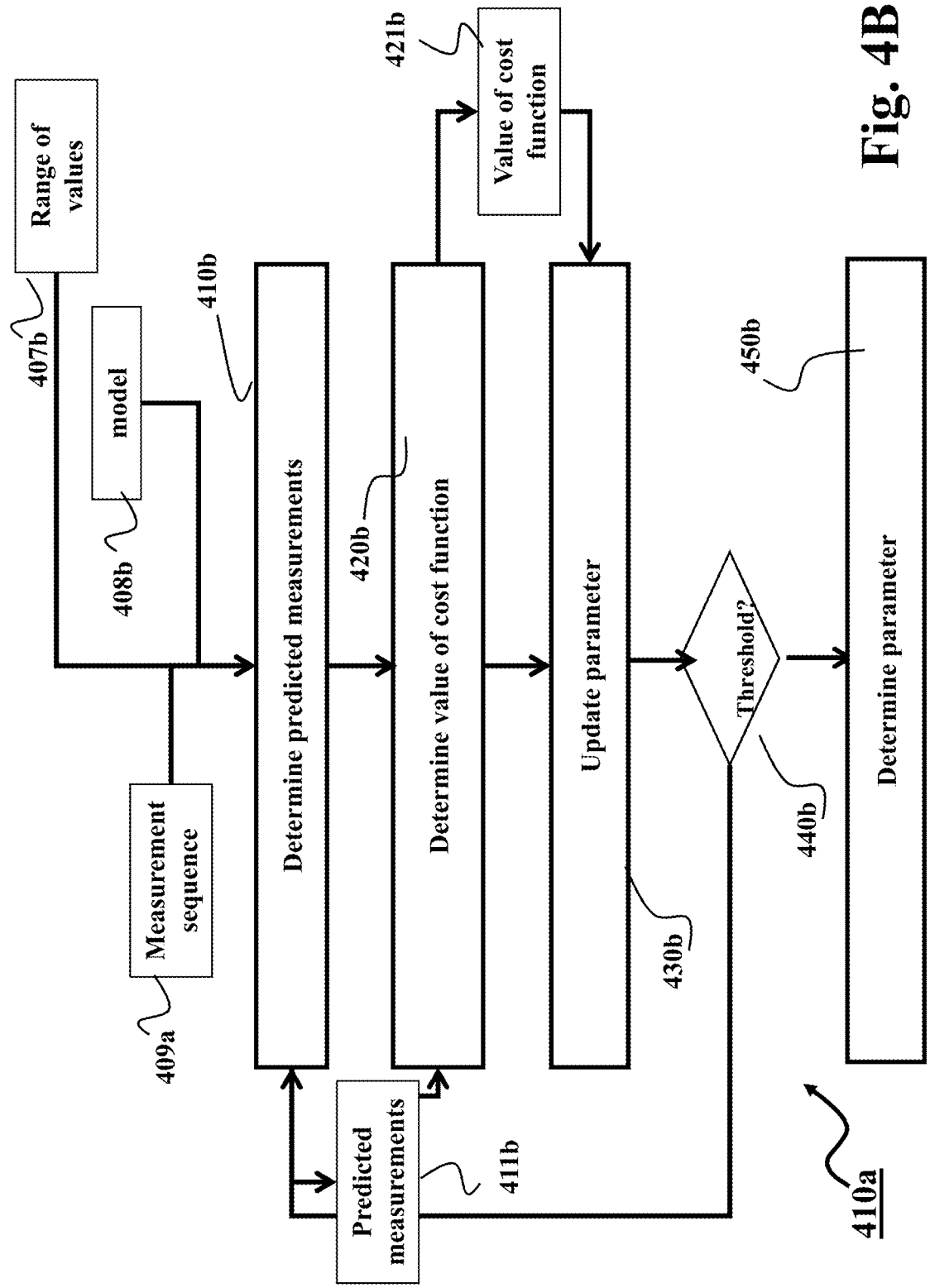
FIG. 4B shows a flowchart of a method for determining initial parameters for the estimator according to some embodiments.

FIG. 4B shows a flowchart of a method for determining initial parameters 410a for the estimator 310a according to some embodiments. Using a measured sequence 409b, wherein measurements include a roll angle of the vehicle and a roll rate of the vehicle, a model 408b of the vehicle roll dynamics having the measurements as outputs of said model, a range 407b of possible values of the parameters, the method determines 410b a predicted measurement sequence as an output of the model of the vehicle roll dynamics using a set of values of parameters determined from the range of values 407b. Using the predicted measurements 411b, the method determines 420b a value of a cost function that reflects the difference between the measurement sequence and the predicted measurement sequence. Then, the method updates 430b the parameters using the history of a combination of values of parameters and values of cost function resulting from the set of values of parameters. If a termination threshold 440b is met, the updated set of parameters are used to determine 450b a probability distribution of the set of possible parameters, from which an initial set of parameters are determined. If the termination threshold 450b is not met, the method determined a new set of predicted measurements using the updated parameters.

In some embodiments, the method 410a is implemented using Bayesian optimization. Bayesian optimization methods are used to solve optimization problems of the form $$\min_{\theta \in \Theta} \mathcal{J}(\theta),$$

where the objective function $\mathcal{J}(\theta)$ is usually too expensive to evaluate for all set of the possible range of values $\Theta$ of internal states and an analytical form of the function is unavailable, making it impossible to derive analytical gradients. To prevent prohibitive expenditure in evaluating the cost, the Bayesian optimization framework models the uncertainty on the cost function at values of the parameters that have not yet been evaluated, as a probability distribution. In one embodiment, the Bayesian optimization uses Gaussian-process regression to construct a replica $\tilde{\mathcal{J}}$ of the true cost function that can be evaluated relatively cheaply, and, therefore, evaluated often. At each iteration of the method, the Gaussian-process regressor $\tilde{\mathcal{J}}$ is used to update 430b the CoG parameter to be used in the next iteration, and the Gaussian process updates its probability distribution by determining 420b the value of the true cost function using the updated 430b CoG parameter $\theta^*$ from the previous iteration.

The determining 430b of the updated CoG parameter is based on the surrogate cost function. In one embodiment, this is done by introducing an acquisition function that is designed to result in the CoG parameter in the range of possible values where the best CoG parameter (the optimal solution), is likely to be located.

One embodiment employs the expected improvement function to update 430b the CoG parameter, wherein the expected improvement function is $\mathcal{A}_{EI}(\theta) = \tilde{\sigma}(\theta)(z\Phi_G(z) + \phi_G(z))$, wherein $\Phi_G$ is the cumulative distribution function and $\phi_G$ is the probability distribution of the standard Gaussian distribution, $$z = \frac{\tilde{\mu}(\theta) - \mathcal{T}(\theta^+)}{\tilde{\sigma}(\theta)},$$

and $\tilde{\mu}(\theta)$ and $\tilde{\sigma}(\theta)$ are the mean and variance from the surrogate function. In one embodiment, the expected improvement is used to determine the next CoG parameter by minimizing the expected improvement.

In some embodiments, not only one CoG parameter but several different possible values of CoG parameters are determined from sampling the probability distribution determined by 410a.

Other embodiments of the invention implement the Bayesian filter using a particle filter, wherein the particle filter maintains a set of particles, each particle represents a weighted estimation of the probability distribution of the CoG parameter, wherein the set of particles collectively can represent the first and the second moments of the estimated probability distribution of the CoG parameter. A particle filter particle also includes an estimate of the vehicle state based on the CoG parameter for said particle and weight of probability of the combination of CoG parameter and vehicle state. Using a particle filter avoids the need for the linear or near-linear assumption of the model of vehicle dynamics and its dependence on unknown parameters estimated by the particle filter.

In some embodiments, the particle filter uses a vehicle model of roll dynamics to update the states. Some embodiments define the CoG parameter as the CoG location, spring stiffness, and damping coefficient, $\theta = [K \ D \ h]^T$. In some embodiments, the particle filter also updates additional states x of the vehicle, wherein the additional state includes a roll rate of the vehicle and a roll angle of the vehicle. Doing in such a manner ensures a connection between measurements and the CoG parameter because the CoG parameter is not directly measured, whereas the additional states are.

One embodiment models the CoG parameter as nearly constant, i.e., it is modeled as a random walk $\theta_{k+1} = \theta_k + w_{\theta,k}$, wherein $w_{\theta,k}$ is a Gaussian distribution. In some embodiments, the vehicle roll dynamics is expressed as $$\dot{x} = \begin{bmatrix} 0 & 1 \\ -\frac{K - mgh}{J} & -\frac{D}{J} \end{bmatrix} x + \begin{bmatrix} 0 \\ \frac{mh}{J} \end{bmatrix} a_y,$$

wherein $J = I_x + mh^2$ and $a_y$ is the measured lateral acceleration. Some embodiments convert the continuous-time roll dynamics model to a discrete-time model.

Accordingly, some embodiments write the complete model of vehicle roll dynamics model used in estimating the CoG parameter on the form $\theta_{k+1} = F\theta_k + w_{\theta,k}$, $x_{k+1} = A(\theta_k)x_k + B(\theta_k)a_y$, $y_k = Cx_k + e_k$, where the measurement $y_k$ relates to the state and CoG parameter.

Using the model of vehicle roll dynamics and a measurement model that relates the model of roll dynamics including the estimated CoG parameter with the measurement, the particle filter determines the probability distribution of the CoG parameter recursively as a weighted combination of the CoG parameter of each particle at each time step of control k, $$p(x_{0:k} \mid y_{0:k}) \approx \sum_{i=1}^{N} q_k^i \delta(x_{0:k}^i - x_{0:k}),$$

wherein $\delta(\bullet)$ is the Dirac delta mass and $q_k^i$ is the weight. Using the model of vehicle roll dynamics including the CoG parameter, one embodiment propagates the CoG parameter forward in time and determines the weight according to $q_k^i \propto q_{k-1}^i p(y_k | x_k^i)$, wherein $p(y_k | x_k^i)$ is the measurement model written as a probability distribution, the likelihood.

In some embodiments, the prediction 430a of the CoG parameter is done concurrently with predicting vehicle states. For example, one embodiment samples a set of process noise $w_{\theta,k}$, and propagates a new CoG parameter using the model $\theta_{k+1} = \theta_k + w_{\theta,k}$. Concurrently, another embodiment predicts the vehicle state by inserting updated 421a CoG parameter using the model of vehicle roll dynamics $x_{k+1} = A(\theta_k)x_k + B(\theta_k)a_y$, and the measured lateral acceleration of the vehicle.

Figure 4C:
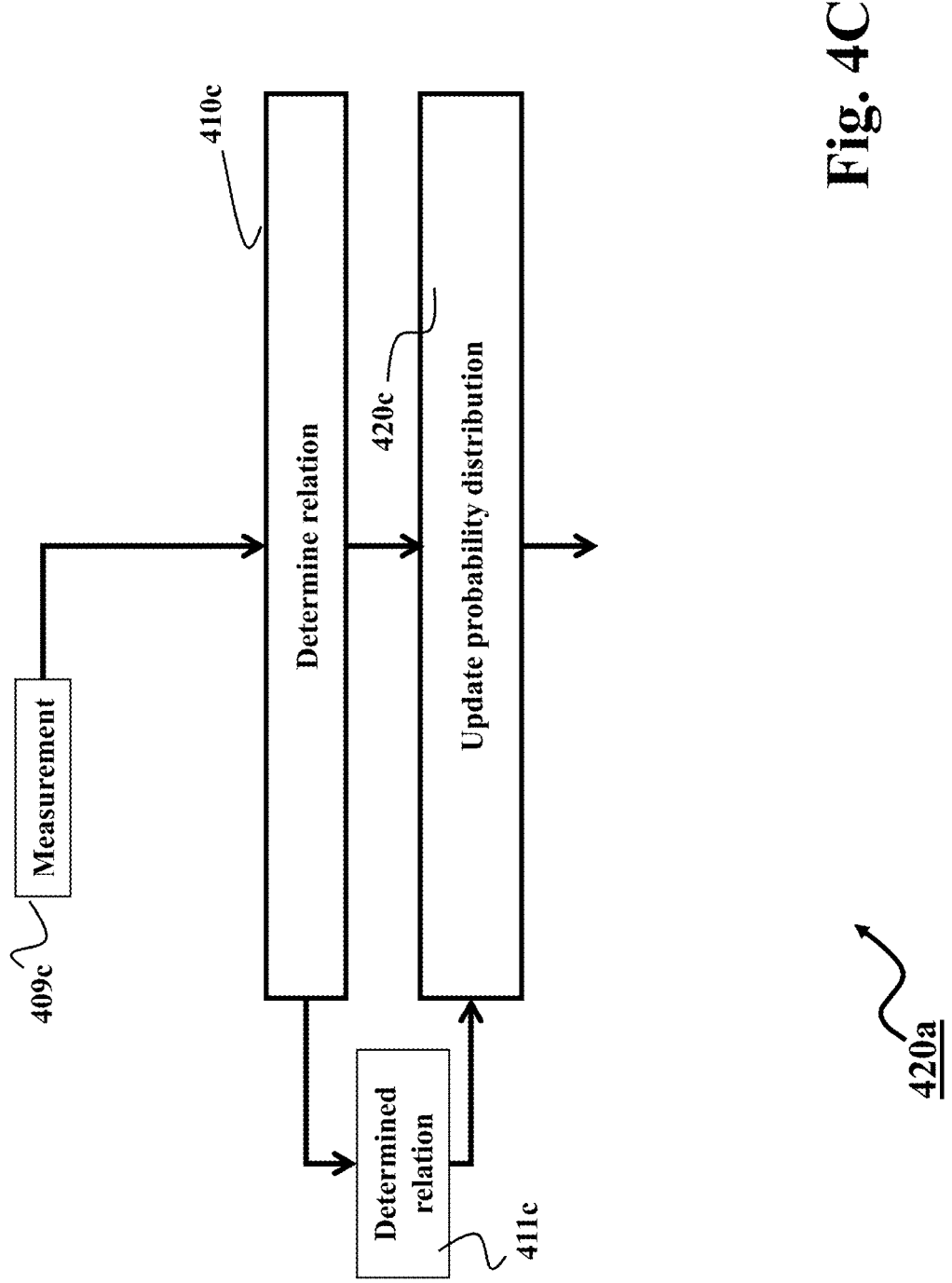
FIG. 4C shows a flowchart of one iteration of a method for estimating the CoG parameter using a particle filter according to one embodiment.

FIG. 4C shows a flowchart of one iteration of a method for estimating 420a the CoG parameter using a particle filter according to one embodiment, wherein the particle filter is executed by a processor of the vehicle. The particle filter estimates the probability distribution of the CoG parameter by a set of weighted particles, wherein each particle represents a weighted estimation of the probability distribution of the CoG parameter, wherein the set of particles collectively represents the first and the second-order moments of the estimated probability distribution of the CoG parameter, wherein the weights are determined according to a fit of a predicted measurement using a measurement model to the measurement. Accordingly, the particle filter determines 410c a relation between the roll angle and the roll rate estimated using the roll dynamics model having the uncertainty of the CoG parameter and the received 409c roll angle and the roll rate. Using the determined relation 411c, the particle filter updates 420c the probability distribution of the CoG parameter based on the determined relation to reducing the difference between the roll angle and roll rate and the received values 409c of the roll angle and roll rate.

Figure 4D:
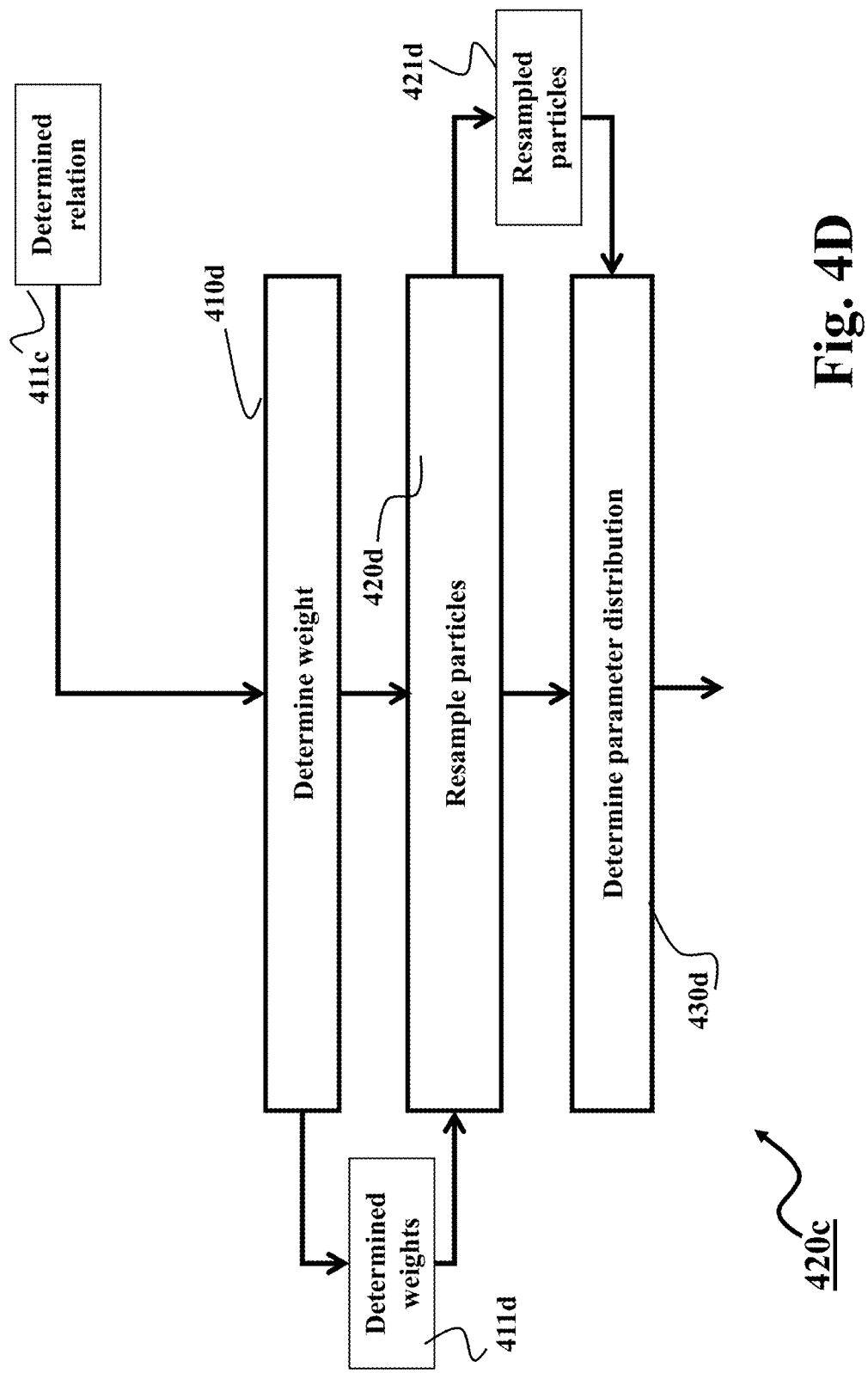
FIG. 4D shows a flowchart of one exemplar implementation of updating the probability distribution of the CoG parameter according to one embodiment.

FIG. 4D shows a flowchart of one exemplar implementation of updating 420c the probability distribution of the CoG parameter according to one embodiment. Using the determined relation 411c, the method determines 410d weights by determining the fit of the roll angle and the roll rate estimated using the roll dynamics model having the uncertainty of the CoG parameter for the particle to the measurement. Then, the weights are normalized to one to make sure that the sum of weights reflects a probability distribution.

Using the determined weights, the most likely, i.e., the best, particles are resampled 420d, to remove particles that are less likely. Using the resampled particles 421d, the probability distribution of the CoG parameter is determined 430d based on the weights.

Figure 4E:
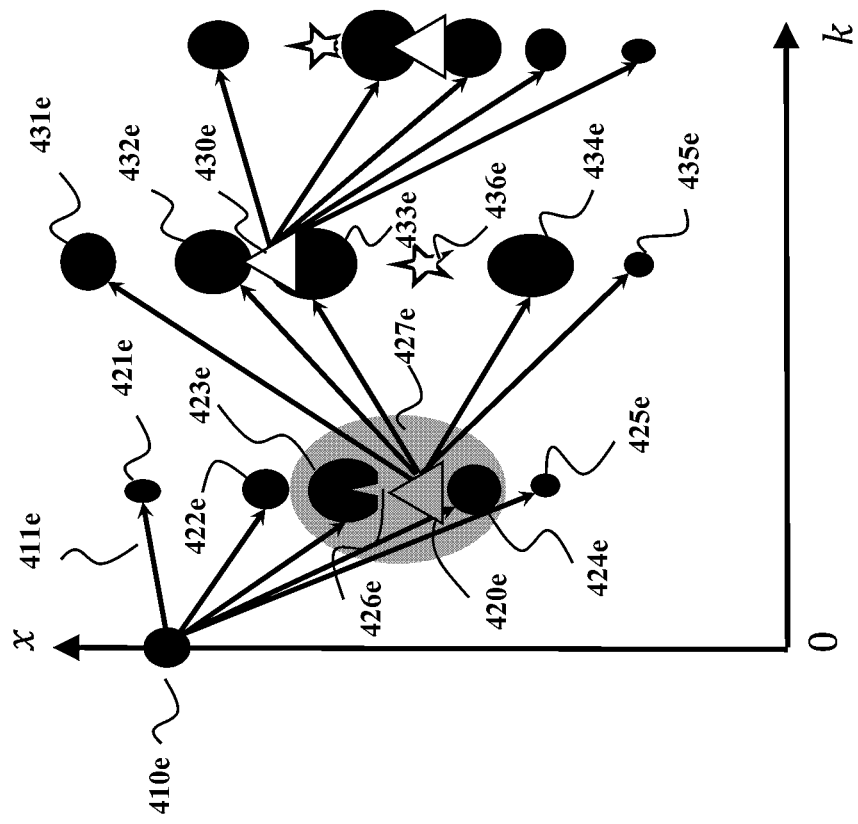
FIG. 4E shows a simplified schematic of the result of three iterations of steps and when five particles are generated for each iteration.

FIG. 4E shows a simplified schematic of the result of three iterations of steps 420a and 430a when five particles are generated for each iteration. The initial state 410e is predicted forward in time 411e using the model of roll dynamics and five sampled CoG parameters, one for each particle, to produce five next states 421e, 422e, 423e, 424e, and 425e. The probabilities are determined as a function of the fit to the measurement 426e and the probabilistic measurement model 427e of the measurement 426e according to the relation between the roll angle and the roll rate estimated using the roll dynamics model having the uncertainty of the CoG parameter and the received roll angle and the roll rate. At each time step, i.e., at each iteration, an aggregate of the probabilities is used to produce a first moment and a second moment of the CoG parameter 420e.

FIG. 4F shows possible assigned probabilities of the five different CoG parameters at the first iteration in FIG. 4E. Those probabilities 421f, 422f, 423f, 424f, and 425f are reflected in selecting the sizes of the dots illustrating the CoG parameters 421e, 422e, 423e, 424e, and 425e. Referring back to FIG. 4E, the most likely particles become the initial CoG parameters for the next iteration that again produces five sampled CoG parameters.

In some embodiments, the number of particles varies with the overall fit to the received values of the roll rate and the roll angle. Particle filters do not need the assumption of a linear model and have convergence rates that are inversely proportional to the square root of the number of particles. However, a finite number of particles is always needed and it is not always straightforward to choose this finite number. To this end, some embodiments adapt the number of particles as a function of the variation of the probabilities according to $N_k=\text{ceil}(N^*(1+\text{Var}(q_k)))$, where $q_k^i$ is the weight of the ith particle, $N^*$ is the minimum allowed number of particles.

Some embodiments are based on the understanding that the particle filter is a computationally heavy Bayesian filter, and for implementation in time-sensitive tasks, such as the control of a vehicle, efficient implementations are necessary. Another embodiment recognizes that the roll angle and roll rate enters linearly into the model of roll dynamics of the vehicle, whereas the CoG parameter enters nonlinearly. Hence, updating the roll angle and roll rate can be done efficiently and analytically using a Kalman filter update for each particle. Doing in such a manner ensures that computational complexity is reduced.

In some embodiments, the estimate of CoG parameter, as well as the confidence of estimate of CoG parameter, are used to control the vehicle to reduce the likelihood of rollover of a vehicle. Any control method for controlling the vehicle based on the probabilistic estimation of the CoG parameter can be used in the vehicle dynamics control system to control the vehicle using a motion model including the CoG parameter.

In some embodiments, the control command determined to reduce the likelihood of rollover is an adjustment of a control command determined by a legacy controller of the vehicle, e.g., a steering angle reference or a braking behavior reference. In other embodiments, the control command determined to reduce the likelihood of rollover is an adjustment of the steering behavior of the driver of the vehicle. In yet other embodiments, the control command determined to reduce the likelihood of rollover is done autonomously without a driver operating the nominal behavior of the vehicle.

Figure 5A:
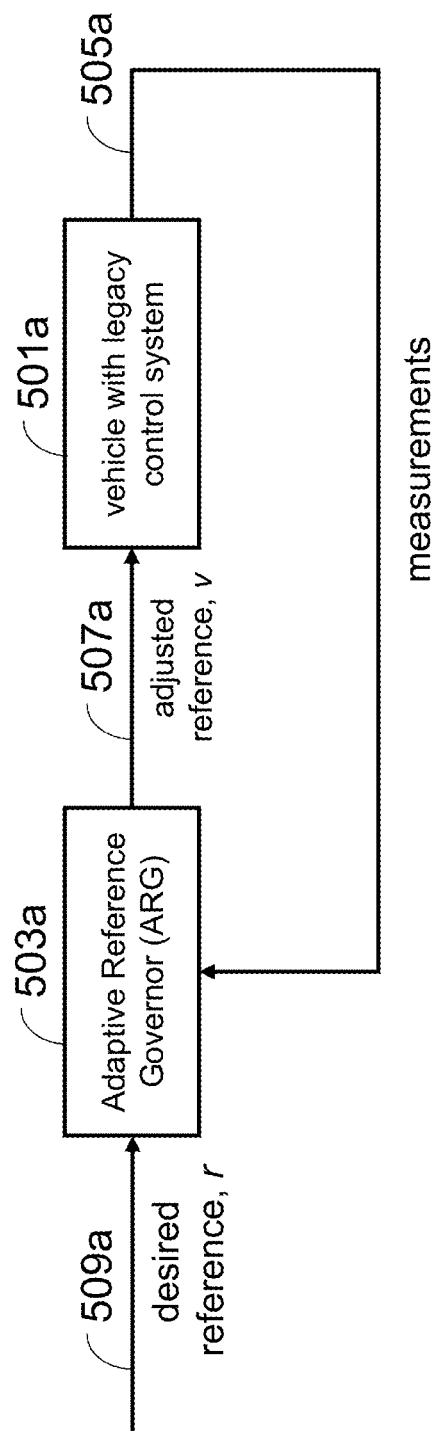
FIG. 5A shows an example of a vehicle controlled by a previously designed legacy controller capable of tracking desired references, according to some embodiments.

FIG. 5A shows an example of a vehicle 501a controlled by a previously designed legacy controller capable of tracking desired references 509a, according to some embodiments. To enforce constraint satisfaction, in some implementations, an adaptive reference governor (ARG) 503a adjusts the desired reference 509a to a constraint-admissible reference 507a using the measurements 505a.

Figure 5B:
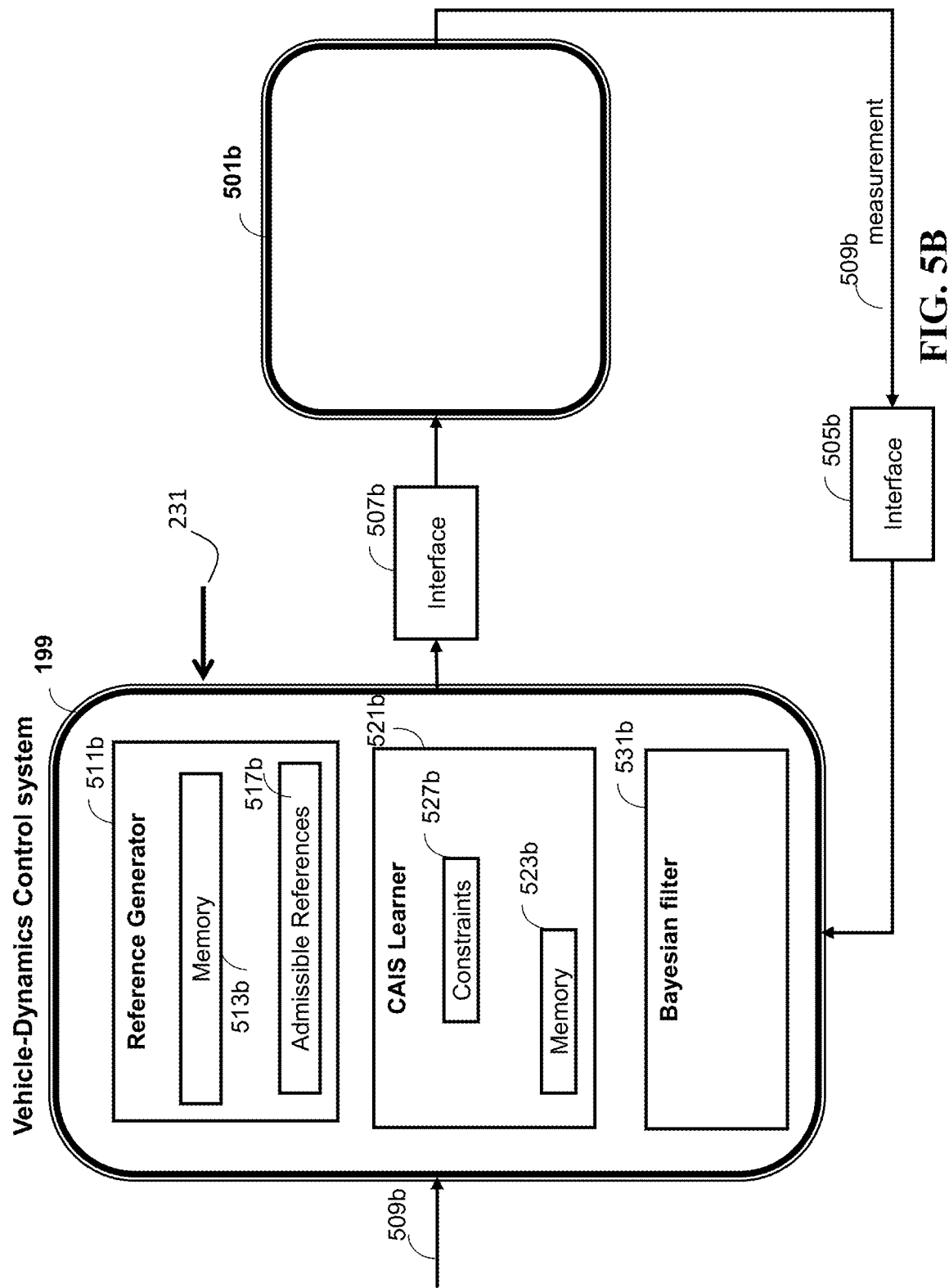
FIG. 5B illustrates a schematic of components of the vehicle-dynamics control system interfaced with a vehicle controlled by a legacy control system.

FIG. 5B illustrates a schematic of components of the vehicle-dynamics control system 199 interfaced with a vehicle controlled by a legacy control system 501b. The desired reference signal 509b can be a steering profile generated by a human operator of the vehicle, or it can be an automatic steering or braking profile generated by the legacy controller. In some embodiments, the vehicle-dynamics control system 199 has the following modules: a Bayesian filter 531b, a constraint-admissible invariant set (CAIS) learning module 521b, and a reference generation module 511b.

The Bayesian filter 531b estimates the CoG parameter and associated uncertainty, e.g., expressed as the second moment, according to some other embodiments. The vehicle 501b and control system is designed to satisfy constraints 527b that arise from safety considerations, physical limitations, and/or specifications, limiting the range where the outputs, the inputs, and also possibly the states of the vehicle are allowed to operate. E.g., a constraint can be a maximum roll angle of the vehicle, or it can be a maximum allowed load transfer of a vehicle, where values beyond said constraint the vehicle risks rollover. The constraints 528b are defined in continuous space. For example, state constraints are defined in the continuous state space of the vehicle, and reference input constraints are defined in continuous reference input space. The CAIS learning module 521b takes estimates of CoG parameter from the Bayesian filter 531b, along with features and labels stored in the memory 523b to generate constraint-admissible sets using the CPU/GPU or for use in the reference generator module 511b.

Given a desired reference input 509b such as a commanded steering profile from a driver of the vehicle, the reference generator unit 511b adjusts this desired reference input r to an adjusted reference input v using the CAIS generated by the CAIS learner 521b. The adjusted reference input belongs to a set of admissible references 517b, such as limits of steering angles of a vehicle. The reference generator accesses its memory 513b to find the adjusted reference in the previous time instant and updates that to compute the new adjusted reference. The adjusted reference input is connected with the vehicle via the interface 507b and is guaranteed to enforce constraints 527b without altering the behavior or structure of the legacy control system or, in the case of a fully human-operated vehicle, the behavior of the driver.

Figure 5C:
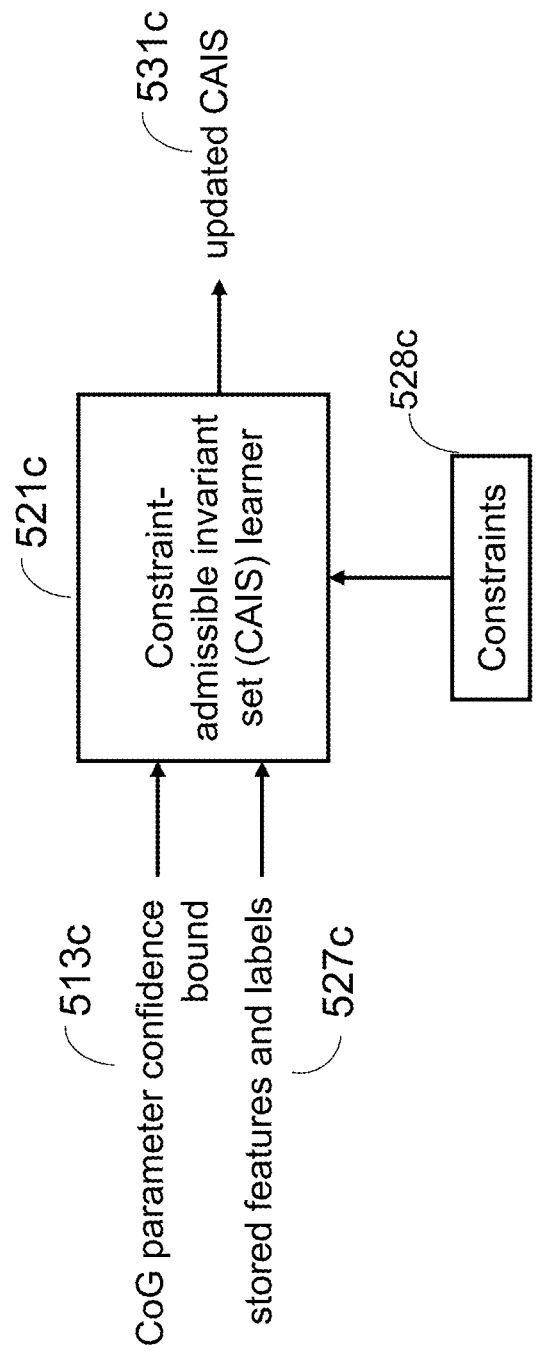
FIG. 5C provides a block representation of the CAIS learner.

FIG. 5C provides a block representation of the CAIS learner 521c that leverages the CoG parameter estimate bound 513c from the Bayesian filter and stored state features and constraint-admissibility labels 527c to learn an updated CAIS 531b given the constraints 528c, according to some embodiments.

Some embodiments use parameter-robust CAISs to enforce constraints of the vehicle. Some embodiments let $H=\{(x,v)\in X\times V: h(x,v)\in Y\}$ denote the set of state and reference inputs for which the output Y satisfies the constraints. Then the parameter-robust constraint admissible set is the set $O(\hat{\Theta})\subset H$ if, for every initial condition $(x,v)\in O(\hat{\Theta})$, when $x_0=x$ and $v_t=v$ for all $t\geq 0$, $(x_t,v_t)\in H$ for every $\theta\in\hat{\Theta}$ and for all $t>0$, the set $O(\hat{\Theta})$ is invariant.

In one embodiment a load transfer ratio related constraint is checked. The load transfer ratio measures how much of the vertical load of the vehicle is concentrated on one of the vehicle sides according to $$LTR = \frac{F_{z,R} - F_{z,l}}{mg},$$

where $F_z$ is the vertical load. Wheel liftoff, hence imminent rollover, happens when the LTR becomes higher than 1 or lower than −1. Hence, in one embodiment the rollover avoidance constraint is determined as $LTR \in [-LTR_{lim}, LTR_{lim}], 0 < LTR_{lim} < 1$ To generate estimates of parameter-robust constraint admissible sets, some embodiments employ an offline sampling-driven approach to collect data for learning the sets online as measurements become available.

Consequently, some embodiments use an estimate of a parameter-robust constraint admissible set to evaluate the control law $$v_t = \overline{G}(v_{t-1}, x_t, \hat{\Theta}_t, r_t)$$

$$= v_{t-1} + G(v_{t-1}, x_t, \hat{\Theta}_t, r_t)(r_t - v_{t-1}),$$

by solving for $$G(v_{t-1}, x_t, \hat{\Theta}_t, r_t) := \operatorname{argmin}_{\gamma_t} (v_t - r_t)^2$$

subject to: $(v_t, x_t) \in O(\hat{\Theta}_{t-1})$, $$v_t = v_{t-1} + \gamma_t (r_t - v_{t-1}),$$

$0 \le \gamma_t \le 1,$ $$v_t \in V_\varepsilon(\hat{\Theta}_t) \quad (8)$$

at each time instant t. Note that $V_\varepsilon(\hat{\Theta}_t)$ denotes the set of references v such that a ball of radius $\varepsilon > 0$ centered at the corresponding steady-state $x^{ss}(v, \theta)$ and v lies inside $O(\hat{\Theta}_t)$.

Some embodiments simulate trajectories of the vehicle using a motion model of the dynamics of the vehicle offline including a CoG parameter, from different initial states sampled from $\mathbb{X}$, reference inputs sampled from $\mathbb{V}$, and CoG parameter within $\Theta$. At the end of each offline simulation, if an initial condition $x_i \in \mathbb{X}$ tracks the desired reference input $v_j \in \mathbb{V}$ without violating the constraints at any time in the simulation, for a CoG parameter $\theta_i$ sampled within $\Theta$, then the feature $(x_i, v_j)$ is labeled '+1' to indicate it resides within the parameter-robust constraint admissible set $\mathcal{O}(\theta_i)$. Contrarily, if the constraint is violated at any time point in the simulation, the feature is labeled '−1' to indicate it resides outside $\mathcal{O}(\theta_i)$. This sets up a binary classification problem that is solved via supervised machine learning by one embodiment.

Figure 5D:
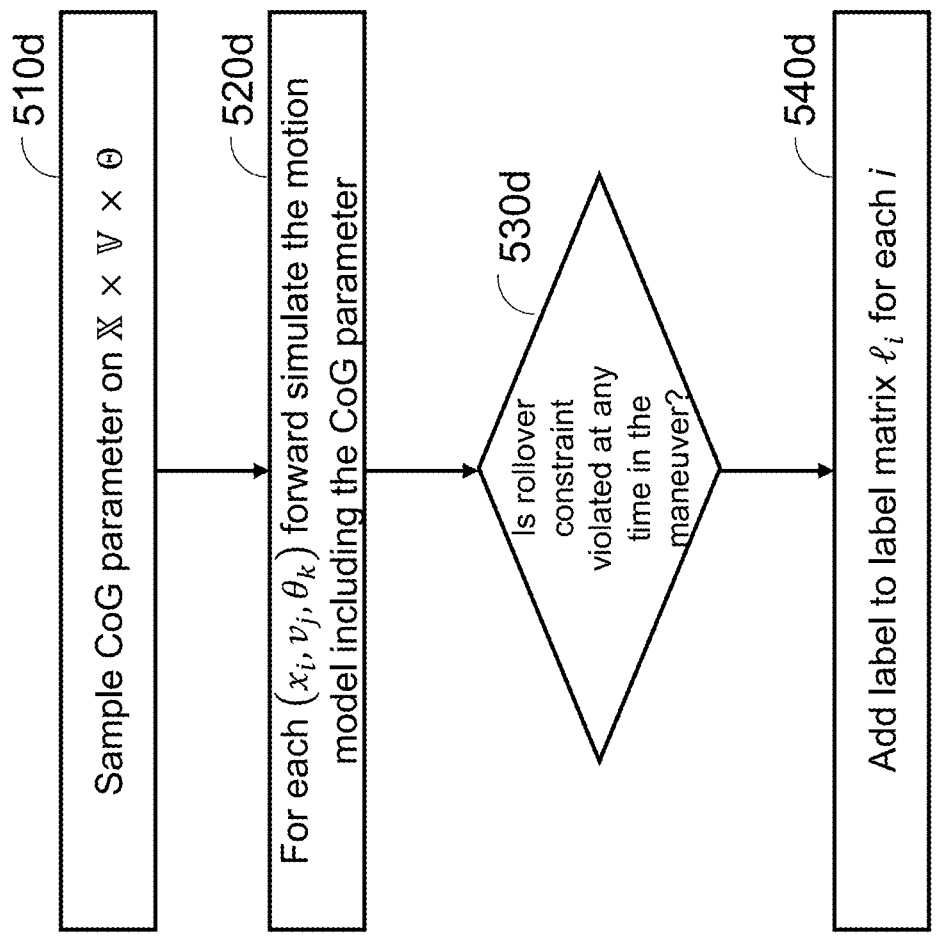
FIG. 5D shows a flowchart of a method for generating offline features and labels used in CAIS according to some embodiments.

FIG. 5D shows a flowchart of a method for generating offline features and labels used in CAIS according to some embodiments. In this case, the method extracts $N_x$ unique samples from $\mathbb{X}$ and construct grids (not necessarily equidistantly spaced) on $\mathbb{V}$ and $\Theta$ with and $N_\theta$ nodes 510d, respectively. Let $x_i$ denote the i-th sampled state, $v_j$ the j-th sampled reference input, and $\theta_k$ the k-th sampled CoG parameter. For each $(x_i, v_j, \theta_k)$ the method simulates 520d the motion model including the CoG parameter forward in time over a finite horizon $T_s$ with a constant reference $v_j$ and CoG parameter $\theta_k$. The horizon $T_s$ is chosen long enough such that the tracking error is small enough according to pre-defined criteria by the end of the simulation. One embodiment checks for each simulation whether the rollover avoidance constraint is satisfied for every simulation time-point 530d.

One embodiment sets the corresponding label of the sample $x_i$ as $$\ell_i^{j,k} = \begin{cases} +1, & \text{if } y_t \in Y \text{ for every } t \in \{0, 1, \ldots, T_s\}, \\ -1, & \text{otherwise} \end{cases}$$

At the end of the offline data generation procedure, the method includes a fixed collection of initial $\{x_i\}_{i=1}^{N_x}$, and each initial condition $x_i$ has a corresponding $N_v \times N_\theta$ matrix of labels 540d

$$\ell_i = \begin{bmatrix} \ell_i^{1,1} & \cdots & \ell_i^{1,N_\theta} \\ \vdots & \ddots & \vdots \\ \ell_i^{N_v,1} & \cdots & \ell_i^{N_v,N_\theta} \end{bmatrix},$$

from which a labeled set will be generated online for robust invariant set estimation using supervised learning. Some embodiments require an estimate of the set $O(\hat{\Theta}_t)$, which can be obtained using machine learning. In some embodiments, the learning problem is set up as follows. At a time instant t, consider a CoG parameter estimate $\hat{\Theta}_t$ provided by the Bayesian filter. Then, for each $v_j \in \tilde{V}_t$, and each $x_i \in \{x_i\}_{i=1}^{N_x}$ sampled offline, one embodiment assigns the label $$z_{i,j}(\hat{\Theta}_t) = \min_{k \in I_{i,j}(\hat{\Theta}_t)} \ell_i^{j,k},$$

where $$I_{i,j}(\hat{\Theta}_t) := \{k : \theta_k \in \hat{\Theta}_t\}$$

is the index set of parameters contained in the current confidence interval $\hat{\Theta}_t$. Taking the minimum ensures that the estimated set is robust to all parameters within $\hat{\Theta}_t$. That is, if even one $\theta_t$ is infeasible for the particular $v_j$ and $x_i$, then $x_i$ does not belong to the robust parameter invariant set corresponding to $\hat{\Theta}_t$.

With the training data $D := \{(x_i, v_j), z_{i,j}\}$, one embodiment constructs classifiers $\psi_j$, where $j = 1, \ldots, |\tilde{V}_t|$. For each $v_j$, a classifier is trained on features $\{x_i\}$ and their corresponding labels $\{z_{i,j}\}$. These classifiers need to represent inner approximations of the robust parameter invariant sets; to this end, one may select sub-level sets of the decision boundary $\psi_k = 0$ of the classifier until no infeasible sample is contained in the interior of the sub-level set.

Figure 6A:
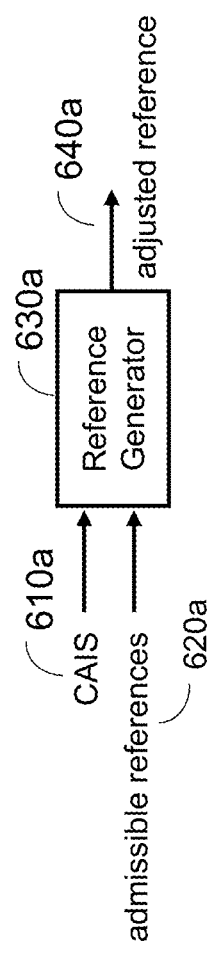
FIG. 6A shows a schematic of the reference generation module in the adaptive reference governor.

FIG. 6A shows a schematic of the reference generation module 630a in the adaptive reference governor. The updated CAIS 610a obtained from the learning module and the set of admissible references 620a is used to computed adjusted references that satisfy the output constraints.

One embodiment computes a solution to (8) efficiently using machine learning and gridding $\mathbb{V}$. Placing a grid on $\mathbb{V}$, along with the constraints, imply that the solution to (8) is contained within the sub-grid of $\mathbb{V}$ defined by $$\tilde{V}_t := [\min\{r_{t,k}, v_{t,k}\}, \max\{r_{t,k}, v_{t,k}\}]. \quad (10)$$

Consequently, one embodiment recasts the problem (8) as a grid search, $$v_t := \operatorname{argmin}_{v \in \tilde{V}_t} (v - r_t)^2$$

subject to: $(v, x_t) \in O(\hat{\Theta}_t)$, $v \in V_\varepsilon(\hat{\Theta}_t)$.

Solving the grid search then becomes identical to selecting the node $v_j$ on the grid $\tilde{V}_t$ that minimizes the cost while ensuring that $\psi_j(x_t) > 0$; that is, the current state is predicted by the j-th classifier to belong to the robust parameter invariant set induced by $\hat{\Theta}_t$.

Figure 7:
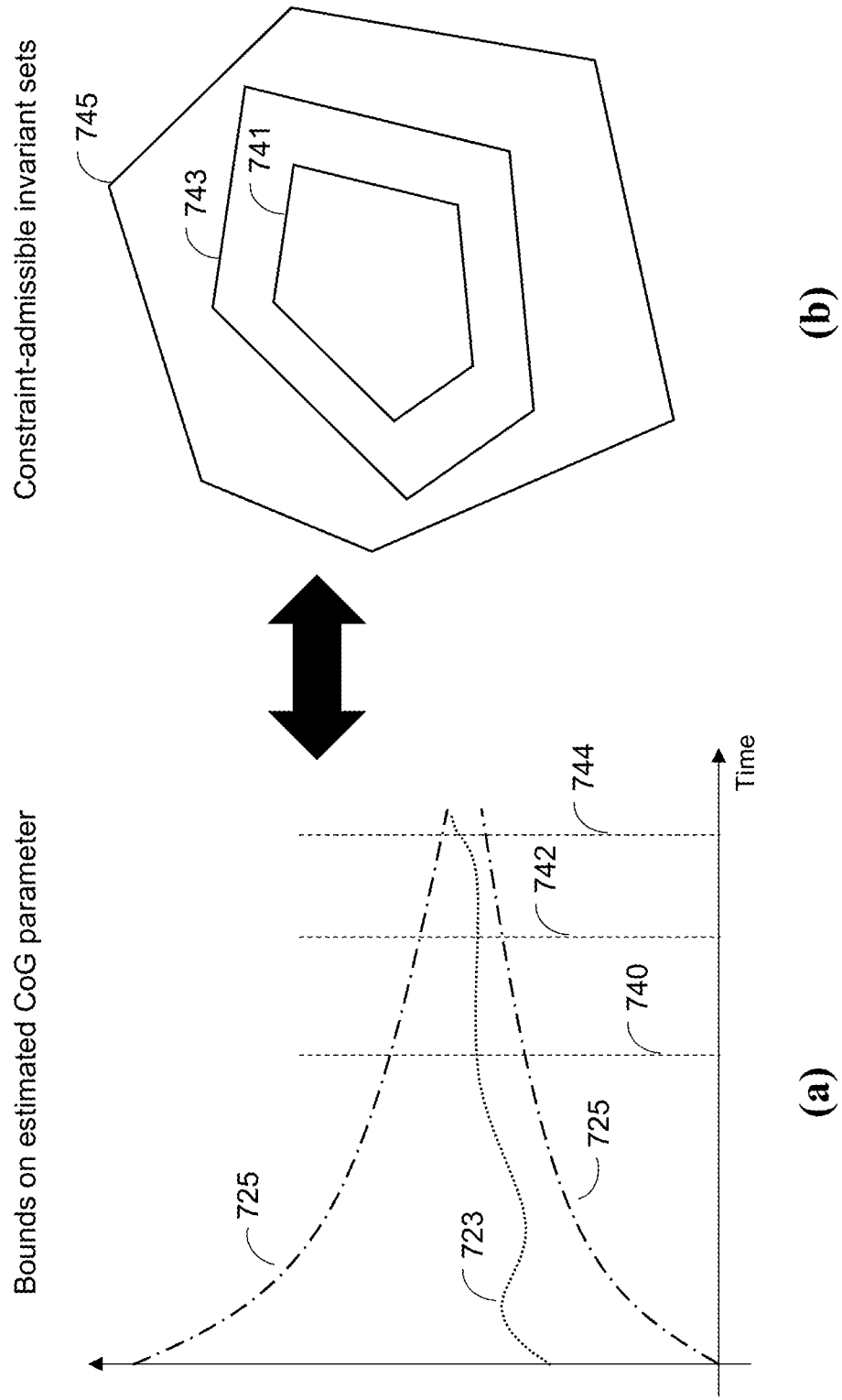
FIG. 7 shows examples of updated CAIS based on gradually contracting bounds around the point estimate.

FIG. 7 shows examples of updated CAIS based on gradually contracting bounds 725 around the CoG parameter estimate 723, e.g., the first moment, of the CoG parameter at increasing time instants 740, 742, 744. Since the uncertainty around the time instant 740 is higher (interval is larger), the corresponding invariant set is tighter 741, but as the bounds shrink from 740 to 742 to 744, the corresponding CAIS expands from 741 to 743 to 745. In some embodiments, the expansion may completely alter the shape of the CAIS such as 743 to 745.

Various different controllers are used by different embodiments of the vehicle dynamics control system for reducing the likelihood of rollover of the vehicle, as long as the controller accounts for aspects of the probability distribution of CoG parameter, e.g., the second moment.

Figure 8A:
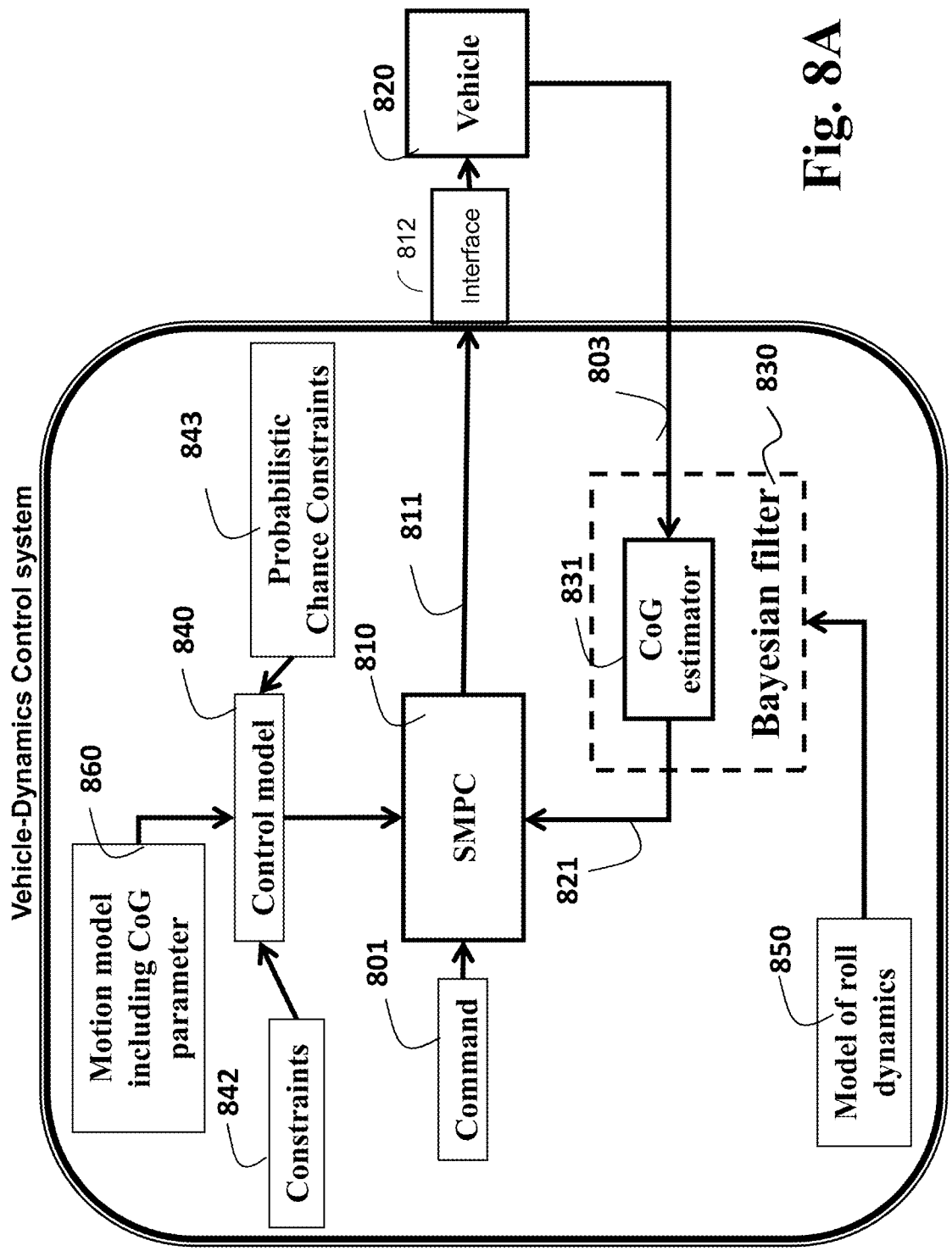
FIG. 8A shows another example of a schematic of components of the vehicle-dynamics control system according to some embodiments.

FIG. 8A shows another example of a schematic of components of the vehicle-dynamics control system 199 according to some embodiments. In this example, the Bayesian filter 830 including the CoG estimator 831 using the model of roll dynamics 850 is connected 821 to a stochastic model-predictive controller (SMPC) 810 for controlling the vehicle. The SMPC uses the motion model 860 including the CoG parameter in a control model of the vehicle for controlling the vehicle. The SMPC can include constraints 842 that represent the physical and operational limits of the vehicle. E.g., the rollover avoidance constraint is included in constraints 842. E.g., maximum limits on the steering angle is included in constraints 842, a maximum allowed lateral deviation on the road. During the operation, the SMPC 810 receives a command, e.g., a steering command 801 indicating the desired behavior of the system. In response to receiving the command 801, the SMPC generates a control signal 811 that serves as an input for the vehicle 820 through an interface 812.

In some embodiments, the control model 840 for SMPC 810 can include one or multiple probabilistic chance constraints 843. As used herein, a chance constraint is a constraint defining physical or geometric limitations of the vehicle accounting for the uncertainty of different aspects of the control model. E.g., a chance constraint can define constraints on the lateral displacement of the vehicle on the road, or it can include the rollover avoidance constraint. Different embodiments can formulate one or multiple of any of the physical limitations and specification constraints for the vehicle as one or multiple probabilistic chance constraints 843, which aim to enforce that the probability of violating the corresponding constraint is below a certain probability threshold value.

In various embodiments, the control model 840 of the system includes a motion model of the vehicle including the CoG parameter with first and second moments of the estimated probability distribution of the CoG parameter. E.g., the first and second moments of the estimated probability distribution of uncertainty of the CoG parameter are included in the control model.

Figure 8B:
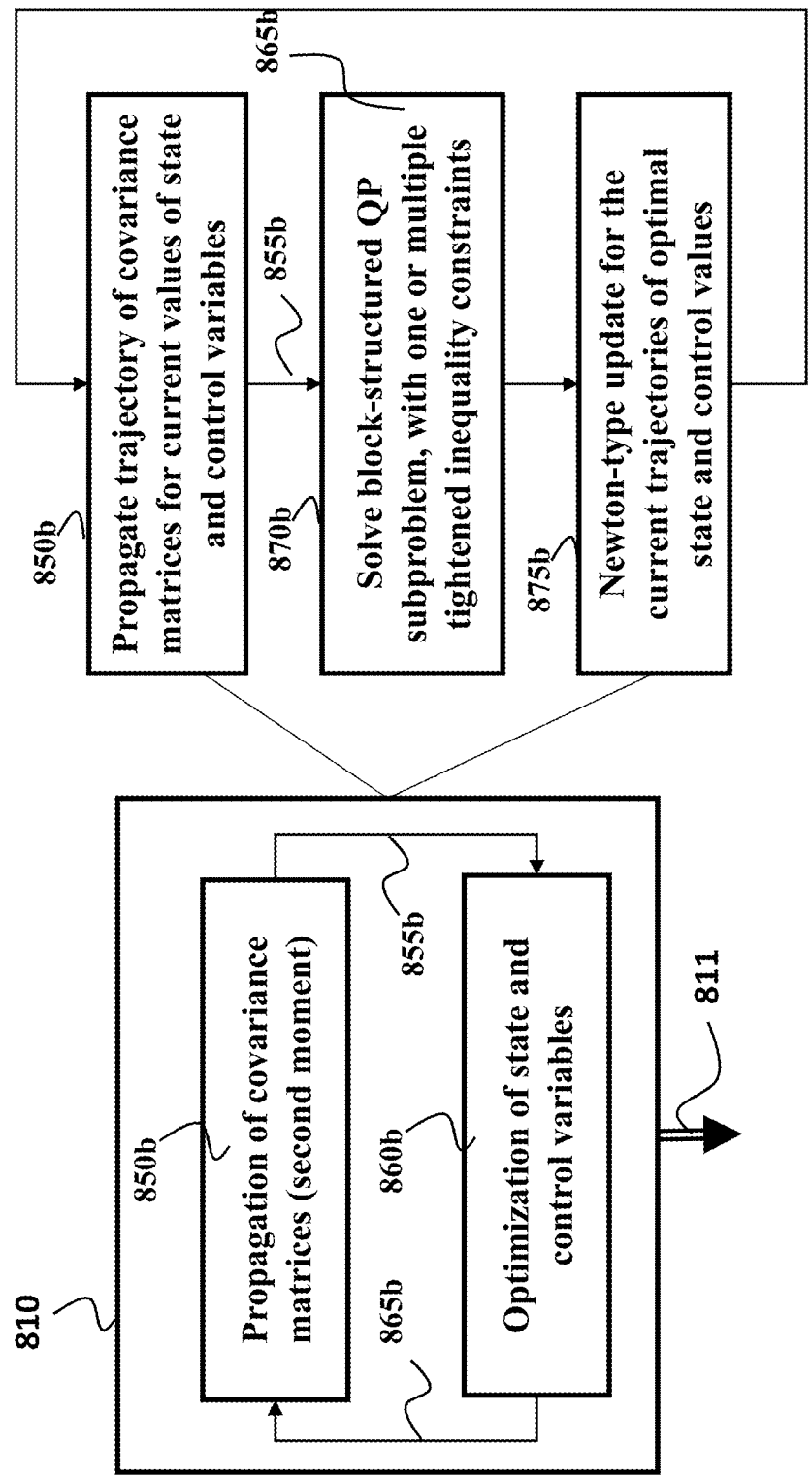
FIG. 8B shows a block diagram of an exemplar implementation of a two-level optimization procedure to solve the inequality constrained nonlinear dynamic optimization problem at each control step of the SMPC.

FIG. 8B shows a block diagram of an exemplar implementation of a two-level optimization procedure to solve the inequality constrained nonlinear dynamic optimization problem at each control step of the SMPC 810, including probabilistic chance constraints representing the uncertainty of CoG parameter to produce a control command reducing the likelihood of a rollover. The two-level optimization procedure alternates propagation of second moments, i.e., covariance matrices, 850b extracted from the probability distribution of the uncertainty of the CoG parameter of the probabilistic chance constraints within the prediction horizon for fixed values of the state, and control variables 865b with optimization of the state and control variables 860b within the prediction horizon for fixed values of the CoG parameter covariance matrices 855b. The control signal 811 is computed, once a termination condition is met for the two-level optimization procedure.

In some embodiments of the invention, the two-level optimization procedure 810 consists of three main computational steps. The first step prepares the linear-quadratic objective function, computes the Jacobian matrices to prepare the linearized equality and inequality constraints and it propagates a trajectory of covariance matrices 850b, which represent the uncertainty for the predicted state values over the control horizon influenced by the second moment of the CoG parameter, by evaluating the nonlinear covariance propagation equations for a current trajectory of state, CoG parameter, and control values 865b. The second step consists of the solution of the resulting block-structured QP subproblem, with one or multiple tightened inequality constraints to approximate each of the chance constraints 870b. The third and final step includes the Newton-type update for the current trajectories of optimal state and control values 875b.

In some embodiments, adjoint gradient computations are used to correct inexact Jacobian information in the SMPC and the resulting two-level optimization procedure consists of three main computational steps. The first step prepares the linear-quadratic objective function, computes the Jacobian matrices with respect to state and control variables to prepare the linearized equality and inequality constraints, computes the adjoint-based gradient evaluation, and numerically eliminates the covariance matrices from each of the objective and constraint functions by propagating a trajectory of covariance matrices, i.e., second moment, 850b for a current trajectory of predicted state and control values 865b using the motion model including CoG parameter. The second step consists of the solution of the resulting block-structured QP subproblem, with one or multiple tightened inequality constraints to approximate each of the chance constraints 870b. The third and final step includes the Newton-type update for the trajectories of optimal state and control values 875b, as well as an expansion of the corresponding update of Lagrange multipliers.

Figure 9A:
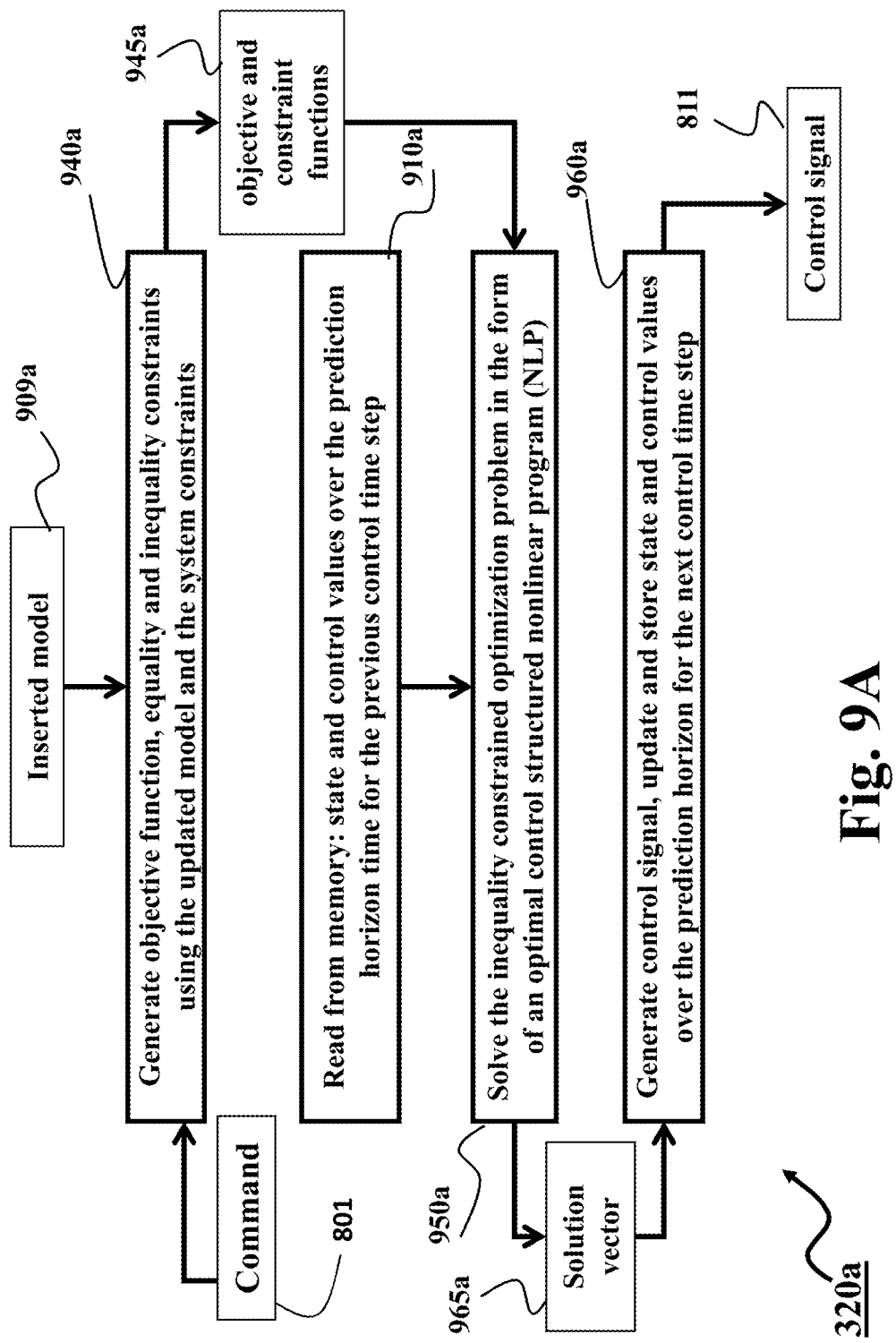
FIG. 9A shows a block diagram to implement the SMPC using the control model that includes the motion model including the CoG parameter.

FIG. 9A shows a block diagram to implement the SMPC using the control model 840 that includes the motion model 860 including the CoG parameter. Specifically, SMPC computes a control solution, e.g., a solution vector 965a that includes a sequence of future optimal or approximately optimal control inputs over a prediction time horizon of the system 960a, by solving a constrained optimization problem 950a at each control time step. The data 945a of the objective function, equality, and inequality constraints in this optimization problem 950a depend on the control model and system constraints 940a, determined from the current state estimate of the system, the estimated CoG parameter, and the control command.

Embodiments of the invention use a direct optimal control method to formulate the continuous-time SMPC problem as an inequality constrained nonlinear dynamic optimization problem. Some embodiments of the invention use a derivative-based optimization algorithm to solve the inequality constrained optimization problem 950a either exactly or approximately, using an iterative procedure that is based on a Newton-type method and the successive linearization of feasibility and optimality conditions for the optimization problem. Examples of such Newton-type optimization algorithms include interior point methods (IPM) and sequential quadratic programming (SQP). Some embodiments of the invention are based on the realization that the inequality constrained optimization problem 950a has the form of an optimal control structured optimization problem (OCP), such that a structure exploiting implementation of a derivative-based optimization algorithm can be used to compute the solution vector 965a at each control time step.

In some embodiments of the invention, the solution of the inequality constrained optimization problem 950a uses the exact or approximate state and/or control values over the prediction time horizon from the previous control time step 910a, which can be read from the memory, as a solution guess in order to reduce the computational effort of solving the inequality constrained optimization problem 950a at the current control time step. This concept of computing a solution guess from the solution information at the previous control time step 910a is called warm-starting or hot-starting of the optimization algorithm and it can reduce the required computational effort of the SNMPC in some embodiments of the invention. In a similar fashion, the corresponding solution vector 965a can be used to update and store a sequence of exact or approximate state and/or control values for the next control time step 960a.

Figure 9B:
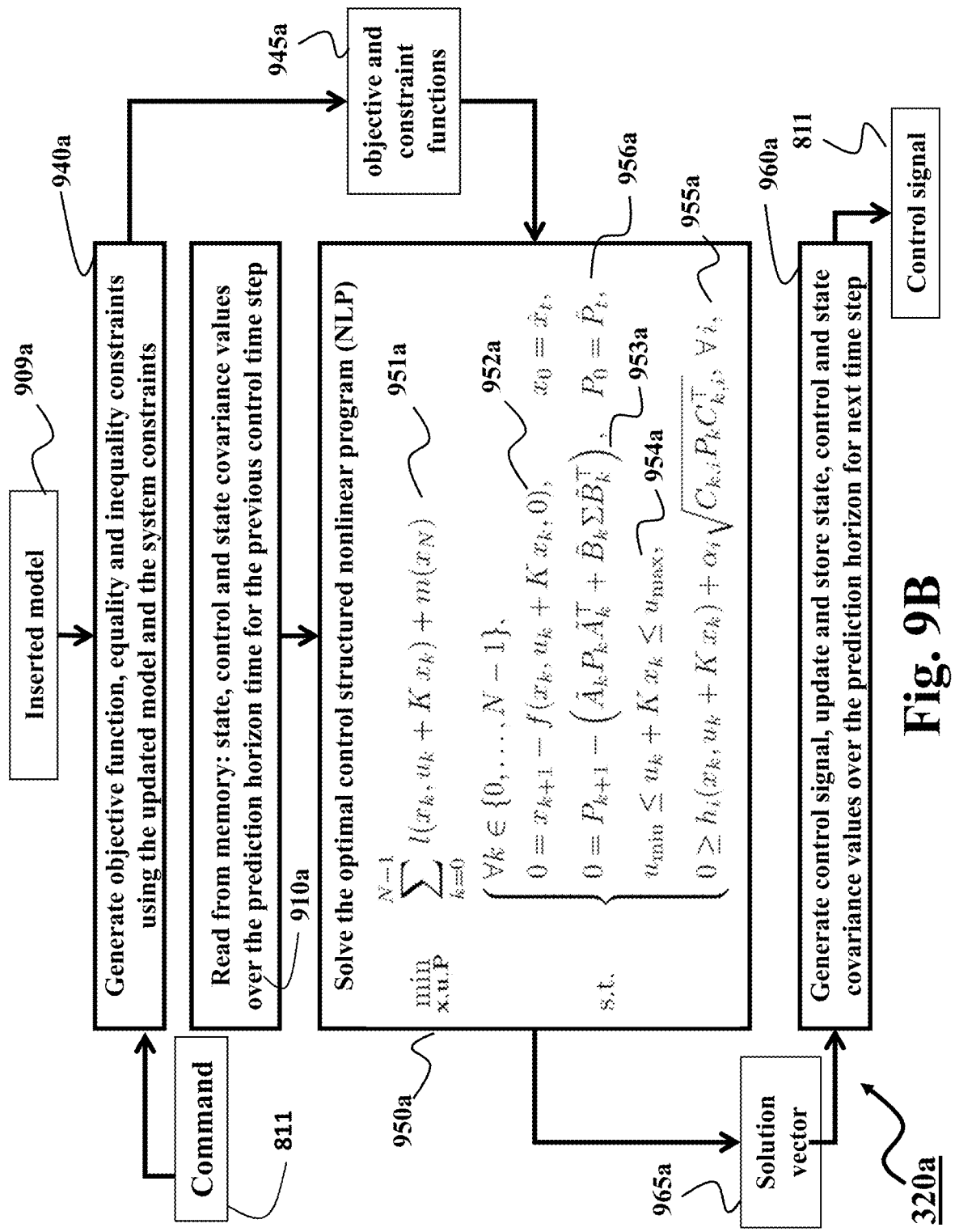
FIG. 9B shows a block diagram of an SNMPC that solves a constrained optimal control structured nonlinear programming problem (OCP-NLP) to compute the control signal at each control time step.

FIG. 9B shows a block diagram of an SNMPC that solves a constrained optimal control structured nonlinear programming problem (OCP-NLP) 950a to compute the control signal 811 at each control time step, given the current state estimate of the system and the estimated CoG parameter that provides the inserted updated model 509a and the command 801. The OCP-NLP 950a includes the state variables $x=[x_0, x_1, \ldots, x_N]$, the state covariance matrix variables $P=[P_0, P_1, \ldots, P_N]$ predicted using the second moment of the CoG parameter and the control input variables $u=[u_0, u_1, \ldots, u_{N-1}]$ over the prediction time horizon as variables in the optimization problem that needs to be solved at each control time step:

$$\min_{x,u,P} \sum_{k=0}^{N-1} l(x_k, u_k + Kx_k) + m(x_N)$$

$$\text{s.t.} \begin{cases} \forall k \in \{0, \ldots, N-1\}, \\ 0 = x_{k+1} - f(x_k, u_k + Kx_k, 0), & x_0 = \hat{x}_t, \\ 0 = P_{k+1} - (\tilde{A}_k P_k \tilde{A}_k^\top + \tilde{B}_k \sum \tilde{B}_k^\top), & P_0 = \hat{P}_t, \\ u_{min} \le u_k + Kx_k \le u_{max}, \\ 0 \ge h_i(x_k, u_k + Kx_k) + \alpha_i \sqrt{C_{k,i} P_k C_{k,i}^\top}, & \forall i, \end{cases}$$

wherein the probability distribution of the CoG parameter is used to determine the state covariance matrix over the prediction horizon.

Some embodiments are based on the current state estimate in an initial state value constraint $x_0 = \hat{x}_t$, a motion model of the vehicle including the CoG parameter as a first moment that results in linear and/or nonlinear equality constraints 952a, a linearization-based approximation of the uncertainty propagation through the motion model resulting in linear and/or nonlinear covariance propagation equations 953a including the covariance matrix $\Sigma$ of the probability distribution of the CoG parameter, bounds 954a on control inputs and linear and/or nonlinear inequality constraints 955a and a linear-quadratic or nonlinear objective function 951a, each of which are defined over the prediction time horizon in the optimal control structured optimization problem. The OCP-NLP data 945a of the objective function, equality, and inequality constraints in this optimization problem 950a depend on the motion model and constraints 940a, the current state of the vehicle, the estimated first moment of CoG parameter, and the control command 801. Examples of the OCP-NLP data 945a include objective functions, e.g., l(•) and m(•) and constraint functions, e.g., f(•) and $h_i$(•). Other examples of the OCP-NLP data 945a include constraint vectors, e.g., $\hat{x}_t$, vec($\hat{P}_t$), $u_{min}$ and $u_{max}$ and matrices, e.g., $\tilde{A}_k$, $\tilde{B}_k$, K and $C_{k,i}$.

In some embodiments, one or multiple of the inequality constraints 955a can be defined as probabilistic chance constraints that aim to ensure that the probability of violating the corresponding inequality constraint is below a certain probability threshold value, i.e., the back-off coefficient value $\alpha_i > 0$ for probabilistic chance constraints and $\alpha_i = 0$ for standard deterministic inequality constraints. Note that deterministic inequality constraints aim to ensure that the corresponding inequality constraint is satisfied for the expected value of the trajectory of state and control values.

Using an approximate formulation of the probabilistic chance constraints 955a, based on an individual tightening for each of the inequality constraints, the resulting inequality constrained nonlinear dynamic optimization problem can be solved using a Newton-type optimization algorithm that is based on successive linearization of the optimality and feasibility conditions. Examples of such Newton-type optimization algorithms include interior point methods (IPM) and sequential quadratic programming (SQP). Some embodiments of the invention are based on the realization that an SQP algorithm solves a quadratic program (QP) approximation for the stochastic nonlinear OCP at each iteration of the SQP optimization algorithm, based on a linear-quadratic approximation of the objective function and a linearization-based approximation for the discretized system dynamics and the discrete-time covariance propagation equations and a linearization-based approximation for each of the inequality constraints and for each of the tightened probabilistic chance constraints.

We claim:
1. A vehicle dynamics control system, comprising:
   at least one processor; and
   a memory having instructions stored thereon that, when executed by the at least one processor, cause the vehicle dynamics control system to:
   receive a feedback state signal indicative of measurements of a state of a motion of a vehicle controlled by a vehicle controller, wherein the state of motion of the vehicle includes values of a roll rate and a roll angle in the vehicle;
   update one or multiple parameters of a roll dynamics model of the vehicle by fitting the values of the roll rate and the roll angle into the roll dynamics model, wherein the roll dynamics model is a spring-damper model that explains an evolution of the roll rate and the roll angle based on the one or multiple parameters including a center of gravity (CoG) parameter modeling a location of a CoG of the vehicle, and a spring constant and a damping coefficient modeling suspension dynamics of the vehicle, and wherein the updated one or multiple parameters include an updated CoG parameter;
   determine, based on the state of motion of the vehicle, a control command for controlling at least one actua- tor of the vehicle using a motion model including the updated CoG parameter; and submit the control command to the vehicle controller to control the motion of the vehicle based on the control command, wherein the vehicle controller includes a constraint-admissible reference trajectory adjusted from a reference signal by an adaptive reference governor (ARG) for the state of motion of the vehicle according to the motion model with the updated CoG parameter, and wherein the ARG is configured to update the constraint-admissible reference trajectory and compute a CoG parameter-robust constraint admissible set based on the updated constraint-admissible reference trajectory.

2. The vehicle dynamics control system of claim 1, wherein the updated one or multiple parameters of the roll dynamics model include the spring constant and the damping coefficient.

3. The vehicle dynamics control system of claim 2, wherein the motion model does not include the spring constant and the damping coefficient of the roll dynamics model.

4. The vehicle dynamics control system of claim 1, wherein the motion model includes planar dynamics of the vehicle.

5. The vehicle dynamics control system of claim 4, wherein the motion model includes roll dynamics of the vehicle.

6. The vehicle dynamics control system of claim 1, wherein the CoG parameter is estimated probabilistically as a probability distribution of the CoG parameter using a Bayesian filter, and wherein the motion model includes first and second moments of the probability distribution of the CoG parameter capturing an uncertainty of estimation of the CoG parameter, such that the control command is determined based on the uncertainty of estimation of the CoG parameter.

7. The vehicle dynamics control system of claim 6, wherein the Bayesian filter is a Kalman filter assuming the probability distribution of the CoG parameter being a Gaussian distribution.

8. The vehicle dynamics control system of claim 6, wherein the Bayesian filter is a particle filter.

9. The vehicle dynamics control system of claim 8, wherein the particle filter maintains a set of particles, each particle represents a weighted estimation of the probability distribution of the CoG parameter, wherein the set of particles collectively represents the first and second moments of the probability distribution of the CoG parameter, wherein to update the set of particles, the processor is configured to:

determine a relation between the roll angle and the roll rate estimated using the roll dynamics model having the uncertainty of estimation of the CoG parameter and the values of the roll angle and the roll rate; and update the probability distribution of the CoG parameter based on the determined relation between the roll angle and the roll rate.

10. The vehicle dynamics control system of claim 1, wherein the vehicle dynamics control system updates the CoG parameter iteratively starting from initial values of the one or multiple parameters of the roll dynamics model, wherein the initial values are determined by minimizing a cost function that reflects a difference between a sequence of historical values of the roll rate and the roll angle and a sequence of estimated values of the roll rate and the roll angle estimated based on values of the one or multiple parameters of the roll dynamics model selected from a range of possible values of the one or multiple parameters.

11. The vehicle dynamics control system of claim 10, wherein the cost function is a Gaussian-process regressor optimized by a Bayesian optimization.

12. The vehicle dynamics control system of claim 1, wherein the control command is submitted to override control signals generated by the vehicle controller.

13. The vehicle dynamics control system of claim 1, wherein the control command is submitted as a feedforward input to the vehicle controller.

14. The vehicle dynamics control system of claim 13, wherein the control command is determined to control a rollover of the vehicle.

15. The vehicle dynamics control system of claim 14, wherein the vehicle controller is a stochastic model-predictive controller (SMPC) for solving an inequality constrained optimization problem subject to constraints including a rollover avoidance constraint, wherein the SMPC uses a second moment of a probability distribution of the CoG parameter to determine the control command.

16. The vehicle dynamics control system of claim 1, wherein the ARG includes a constraint-admissible invariant set (CAIS) learner configured to generate constraint-admissible sets using a probability distribution of the CoG parameter.

17. The vehicle dynamics control system of claim 16, wherein the CAIS learner is configured to utilize CoG parameter estimates and stored state features and constraint-admissibility labels to learn an updated CAIS.

18. The vehicle dynamics control system of claim 1, wherein the CoG parameter is estimated numerically using a particle filter.

19. A vehicle dynamics control system, comprising:
at least one processor; and
a memory having instructions stored thereon that, when executed by the at least one processor, cause the vehicle dynamics control system to:

receive a feedback state signal indicative of measurements of a state of a motion of a vehicle controlled by a vehicle controller, wherein the state of motion of the vehicle includes values of a roll rate and a roll angle in the vehicle;

update one or multiple parameters of a roll dynamics model of the vehicle by fitting the values of the roll rate and the roll angle into the roll dynamics model, wherein the roll dynamics model is a spring-damper model that explains an evolution of the roll rate and the roll angle based on the one or multiple parameters including a center of gravity (CoG) parameter modeling a location of a CoG of the vehicle, and a spring constant and a damping coefficient modeling suspension dynamics of the vehicle, and wherein the updated one or multiple parameters include an updated CoG parameter, wherein the CoG parameter is estimated probabilistically as a probability distribution of the CoG parameter using a particle filter that maintains a set of particles, each particle representing a weighted estimation of the probability distribution of the CoG parameter, and wherein a motion model includes first and second moments of the probability distribution of the CoG parameter capturing an uncertainty of estimation of the CoG parameter and the set of particles collectively represent the first and second moments of the probability distribution of the CoG parameter, determine, based on the state of motion of the vehicle and the uncertainty of estimation of the CoG parameter, a control command for controlling at least one actuator of the vehicle using a motion model including the updated CoG parameter; and submit the control command to the vehicle controller to control the motion of the vehicle based on the control command.

20. The vehicle dynamics control system of claim 19, wherein to update the one or multiple parameters of the roll dynamics model of the vehicle, the processor is configured to update the set of particles by:

determining a relation between the roll angle and the roll rate estimated using the roll dynamics model having the uncertainty of estimation of the CoG parameter and the values of the roll angle and the roll rate; and updating the probability distribution of the CoG parameter based on the determined relation between the roll angle and the roll rate.

* * * * *